(12) United States Patent
Chiricescu et al.

(10) Patent No.: US 10,719,630 B2
(45) Date of Patent: *Jul. 21, 2020

(54) PROGRAMMABLE UNIT FOR METADATA PROCESSING

(71) Applicants: BAE Systems Information and Electronic Systems Integration Inc., Nashua, NH (US); THE TRUSTEES OF THE UNIVERSITY OF PENNSYLVANIA, Philadelphia, PA (US)

(72) Inventors: Silviu S Chiricescu, Arlington, MA (US); Andre DeHon, Philadelphia, PA (US); Udit Dhawan, Philadelphia, PA (US)

(73) Assignees: BAE Systems Information and Electronic Systems Integration Inc., Nashua, NH (US); The Trustees of the University of Pennsylvania, Philadelphia, PA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/134,942

(22) Filed: Sep. 18, 2018

(65) Prior Publication Data

US 2019/0034665 A1    Jan. 31, 2019

Related U.S. Application Data

(63) Continuation of application No. 14/946,229, filed on Nov. 19, 2015, now Pat. No. 10,078,763.

(Continued)

(51) Int. Cl.
*G06F 21/64*    (2013.01)
*G06F 21/71*    (2013.01)

(52) U.S. Cl.
CPC ............ *G06F 21/64* (2013.01); *G06F 21/71* (2013.01); *G06F 2212/1016* (2013.01); *G06F 2212/1041* (2013.01); *G06F 2212/45* (2013.01)

(58) Field of Classification Search
CPC ....................................................... G06F 21/64
See application file for complete search history.

(56) References Cited

U.S. PATENT DOCUMENTS 8,549,208 B2   10/2013 Lee et al.
9,110,816 B2   8/2015 Lee et al.
(Continued)

OTHER PUBLICATIONS

Dhawan et al., PUMP: A Programmable Unit for Metadata Processing, 3rd International Workshop on Hardware and Architectural Support for Security and Privacy, Jun. 2014.
(Continued)

*Primary Examiner* — William S Powers
(74) *Attorney, Agent, or Firm* — Scott J. Asmus; Sand, Sebolt & Wernow LPA

(57) ABSTRACT

A system and method for metadata processing that can be used to encode an arbitrary number of security policies for code running on a stored-program processor. This disclosure adds metadata to every word in the system and adds a metadata processing unit that works in parallel with data flow to enforce an arbitrary set of policies, such that metadata is unbounded and software programmable to be applicable to a wide range of metadata processing policies. This instant disclosure is applicable to a wide range of uses including safety, security, and synchronization.

18 Claims, 30 Drawing Sheets

Related U.S. Application Data

(60) Provisional application No. 62/081,891, filed on Nov. 19, 2014.

(56) References Cited

U.S. PATENT DOCUMENTS

| | | | |
|---|---|---|---|
| 9,785,440 | B2 | 10/2017 | Delton |
| 10,078,763 | B2 | 9/2018 | Chiricescu et al. |
| 2005/0154838 | A1* | 7/2005 | DeWitt, Jr. ......... G06F 9/30181 711/144 |
| 2009/0254572 | A1* | 10/2009 | Redlich ................ G06Q 10/06 |
| 2012/0117610 | A1* | 5/2012 | Pandya ............... H04L 63/0485 726/1 |
| 2015/0010000 | A1* | 1/2015 | Zhang .................... H04L 45/38 370/392 |

OTHER PUBLICATIONS

Chiricescu et al., SAFE: A Clean-Slate Architecture for Secure Systems, IEEE International Conference on Technologies for Homeland Security (HST), Nov. 2013.

Asanovic, K. & Patterson, D., The Case for Open Instruction Sets, Microprocessor Report, The Linley Group, Aug. 18, 2014.

Dhawan et al., Architectural Support for Software-Defined Metadata Processing, 20th International Conference on Architectural Support for Programming Languages and Operating Systems, Istanbul, Turkey, Mar. 15, 2015.

Dhawan, U. & Dehon, A., Area-Efficient Near-Associative Memories on FPGAs, ACM Transactions on Reconfigurable Technology and Systems (TRETS), vol. 7, No. 4, DOI 10.1145/2629471, Jan. 1, 2015.

Azevedo De Amorim et al., A Verified Information-Flow Architecture, 41st ACM SIGPLAN-SIGACT Symposium on 3rinciples of Programming Languages (POP:), San Diego, California, Jan. 22, 2014.

Kwon et al., Low-Fat Pointers: Compact Encoding and Efficient Gate-Level Implementation of Fat Pointers for Spatial Safety and Capability-based Security, 20th ACM Conference on Computer and Communications Security, Berlin, Germany, Nov. 6, 2013.

Hritcu et al., Testing Noninterference, Quickly, 18th ACM SIGPLAN International Conference on Functional Programming (ICFP), pp. 455-468, Boston, Massachusetts, Sep. 27, 2013.

Hawkins, T., Redesigning the Computer for Security (talk), Commercial Users of Functional Programming (CUFP) 2013 workshop, https://www.youtube.com/watch?v=Aa19Jy553EY, Sep. 22, 2013.

Montagu et al., A Theory of Information-Flow Labels, IEEE 26th Computer Security Foundations Symposium (CSF), New Orleans, Louisiana, Jun. 26, 2013.

Hritcu et al., All Your IFCException Are Belong to Us, 34th IEEE Symposium on Security and Privacy, pp. 3-17, IEEE Computer Society Press, San Francisco, California, May 20, 2013.

Dwahan, U. & DeHon, A., Area-Efficient Near-Associative Memories on FPGAs, 21st ACM/SIGDA International Symposium on Field-Programmable Gate Arrays, Monterey, California, Feb. 13, 2013.

Dhawan et al., Hardware Support for Safety Interlocks and Introspection, Adaptive Host and Network Security Workshop of SASO 2013, Sep. 14, 2012.

Pierce, Benjamin C., Verification Challenges of Pervasive Information Flow, slides from invited talk given at Programming Languages Meets Program Verification (PLPV) workshop at POPL 2012, Jan. 25, 2012.

DeHon et al., Preliminary Design of the Safe Platform, presented at 6th Workshop on Programming Languages and Operating Systems (PLOS 2011), Cascais, Portugal, Oct. 23, 2011.

DeHon et al., SAFE Proposal Extract, SAFE Project website, http://www.crash-safe.org/docs/SAFE-Proposal-Abstract.html, Jul. 20, 2010.

Asanovic, K. & Patterson, D., Instruction Sets Should be Free: The Case for RISC-V, University of California at Berkeley, Technical Report No. UCB/EECS-2014-146, Berkeley, California, Aug. 6, 2014.

\* cited by examiner

FIG-11A

TABLE 1 - Summary of Investigated Policies

| Policy | Threat | Metadata | Max Unique Tags | Tag Check (allow ?) | Tag Propagation Rules | Ref. |
|---|---|---|---|---|---|---|
| NXD+NWC | code injection | DATA or CODE on memory locations | 2 | CI =CODE; MRI =CODE on write | no | |
| Memory Safety | spatial/temporal memory safety violation on heap | color on pointers; region color + payload color on memory locations | (#mallocs)$^2$ | pointer color == referenced region color | R ← OPi on mov/add/sub; R ← payload(MR) on load | [17] |
| CFI | control-flow hijacking (JOP/ROP/code reuse) | unique id on each indirect control-flow source and target | #sources+#targets | (PC,CI) ∈ program's control-flow path | PC ← CI on indirect jumps (including call, return) | [4] |
| Taint Tracking | untrusted code, low-integrity data from IO | source-taint-id on instructions and IO; set of input taint-ids on words | 2$^{(\#code + IO\ ids)}$ | user-defined check | R ← CI ∪ OP1 ∪ OP2 ∪ MR | [47] |
| Composite | all of the above | structure with 4 elements | product of above | all of the above (Alg. 2 with N=4) | | |

FIG-14

TABLE 2 - Taxonomy of Tagging Schemes

| Tag Bits | Prop-agate? | Outputs allow? | Outputs R(result) | Inputs PC | Inputs CI | Inputs OP1 | Inputs OP2 | Inputs MR | Usage |
|---|---|---|---|---|---|---|---|---|---|
| 2 | X | soft | X | X | X | X | X | ✓ | memory protection |
| word | X | limited prog. | X | X | X | X | X | ✓ | memory hygiene, stack, isolation |
| 32 | X | limited prog. | X | X | X | X | X | ✓ | unforgeable data, isolation |
| 2 | X | fixed | fixed | X | X | X | X | ✓ | fine-grained synchronization |
| 1 | ✓ | fixed | X | X | X | ✓ | X | X | capabilities |
| 2-8 | ✓ | fixed | fixed | X | X | ✓ | ✓ | X | types |
| 128 | ✓ | fixed | copy | X | X | X | X | ✓ | memory safety |
| 0 | ✓ | software defined | | X | X | propagate only one | | | invariant checking |
| 1 | ✓ | fixed | fixed | X | X | ✓ | ✓ | ✓ | taint |
| 4 | ✓ | limited programmability | | X | X | ✓ | ✓ | X | taint, interposition, fault isolation |
| 10 | ✓ | limited prog. | fixed | X | X | ✓ | ✓ | ✓ | taint, isolation |
| unspec. | ✓ | software defined | software defined | X | X | ✓ | ✓ | ✓ | flexible taint |
| 32 | ✓ | software defined | software defined | ✓ | ✓ | ✓ | ✓ | ✓ | programmable, taint, memory checking, reference counting |
| 0-64 | ✓ | software defined | | ✓ | ✓ | ✓ | ✓ | ✓ | information flow, types |
| Unbounded | ✓ | software defined | | ✓ | ✓ | ✓ | ✓ | ✓ | fully programmable, pointer-sized tags |

Propagate = tag propagates with data (✓) or is a property of memory address (X)
allow? = logic for allowing/disallowing operations
R = policy impacts tag of result
PC = programmable tag on program counter
CI = is current instruction tag checked or propagated
OP1, OP2, MR = is tag on these inputs checked or propagated

FIG-15

TABLE 3 - Memory Resource Estimates for the Baseline and Simple PUMP-extended Processors at 32nm node

| Unit | Design | Organization | Area (mm²) | Access Energy Read/Write (pJ) | Static Power (pJ/cyc) | Latency (ps) | Cyc |
|---|---|---|---|---|---|---|---|
| Register File (Int. and FP) | Baseline | 64b, 2R1W, {32 Integer, 32 Floating} | 0.002 | 0.3/0.5 | 0.08 | 264 | 1 |
| | 64b tag extended | 128b, 2R1W, {48 Integer, 32 Floating} | 0.007 | 1.0/1.4 | 0.23 | 295 | 1 |
| L1-$ (I and D) | Baseline | 64KB, 4-way, 64B/line | 0.236 | 17/11 | 14.4 | 880 | 1 |
| | 64b tag extended | 64KB, 4-way, 128B/line (eff. 32KB, 64B/line) | 0.244 | 19/14 | 14.5 | 880 | 1 |
| L2-$ (unified) | Baseline | 512KB, 8-way, 64B/line | 1.207 | 393/481 | 0.111 | 4000 | 5 |
| | 64b tag extended | 1MB, 8-way, 128B/line (eff. 512KB, 64B/line) | 2.350 | 758/1223 | 0.214 | 4930 | 5 |
| TLB (I and D) | Either | 1KB, 2-way set assoc. | 0.04 | 3.6/4.5 | 2 | 800 | 1 |
| DRAM | Baseline | 1GB, access 64B line per transfer | - | 15,000 | - | - | 100 |
| | 64b tag extended | 1GB, access 128B line (eff. 64B line per transfer) | - | 31,000 | - | - | 130 |
| L1 PUMP-$ | 64b tag | fully associative 1024 entry, 328b match, 128b out (not used; shown only for reference) | 1.500 | 750/900 | - | 3000 | 4 |
| | | multi-hash 1024 entry, 328b match, 128b out | 0.683 | 51/62 | 32 | 500 | 1 |
| L2 PUMP-$ | 64b tag | multi-hash 4096 entry, 328b match, 128b out | 0.994 | 173/444 | 0.085 | 3300 | 4 |

Total Baseline Area 1.485mm²
Total 64b-tagged Area 4.318mm² (+ 190% over baseline)

FIG-16

TABLE 4 - PUMP Parameter Range Table

| Unit | Parameter | Range | Final |
|---|---|---|---|
| L1 PUMP-$ | Capacity | 512-4096 | 1024 |
|  | Tag Bits | 8-12 | 10 |
| L2 PUMP-$ | Capacity | 1024-8192 | 4096 |
|  | Tag Bits | 13-16 | 14 |
| UCP-$ | Capacity | 512-4096 | 2048 |
| CTAG-$ | Capacity | 128-1024 | 512 |

FIG-17

TABLE 5 - Memory Resource Estimates for the PUMP-Optimized Processors at 32nm node

| Unit | Design | Organization | Area (mm²) | Access Energy Read/Write (pJ) | Static Power (pJ/cyc) | Latency (ps) | Cyc |
|---|---|---|---|---|---|---|---|
| Register File | Extended 10b | 74b, 2R1W, {48 Integer, 32 Floating} | 0.005 | 0.4/0.5 | 0.13 | 360 | 1 |
| L1 Cache | 10b-tag | 74KB, 4-way, 74B/line (eff. 64KB, 64B/line) | 0.272 | 19/13 | 16.4 | 975 | 1 |
| L2 Cache | 14b-tag | 592KB, 8-way, 78B/line (eff. 512KB, 64B/line) | 1.247 | 343/640 | 0.133 | 4600 | 5 |
| TLB | - | 1KB, 2-way set-assoc. | 0.040 | 3.6/4.5 | 2 | 800 | 1 |
| DRAM | 64b-tag | 1GB, access 128B line (move 76B) | - | 17,500 | - | - | 112 |
| L1 PUMP Cache | 10b L1 tag | multihash 1024-entry, 58b match, 20b out | 0.095 | 15/43.2 | 2.22 | 520 | 1 |
| L2 PUMP Cache | 14b L2 tag | multihash 4096-entry, 78b match, 28b out | 0.287 | 99.4/267 | 0.032 | 2800 | 3 |
| full → L2-tag | 64b → 14b | 8K entry, 64b match, 14b out, multihash | 0.432 | 166/436 | 0.052 | 3400 | 4 |
| L2-tag → full | 14b → 64b | 16K x 64 SRAM | 0.216 | 55.5/31.5 | 0.027 | 1700 | 2 |
| L2-tag → L1-tag | 14b → 10b | 16K x 11 SRAM | 0.038 | 8.8/4.7 | 0.004 | 1420 | 2 |
| L1-tag → L2-tag | 10b → 14b | 1K x 14 SRAM | 0.004 | 0.8/1 | 0.0004 | 780 | 1 |
| UCP Cache | 64b tags | multihash 2048-entry, 328b match, 128b out | 0.377 | 196/479 | 0.035 | 2730 | 3 |
| CTAG Cache | 64b tags | multihash 512-entry | 0.107 | 56/139 | 0.009 | 1700 | 2 |

Total Area  3.120mm² (+110% over baseline)

FIG-18

Algorithm 1 Taint Tracking Miss Handler (Fragment)

1: switch *(op)*
2:    case add, sub, or:
3:       $PC_{new} \leftarrow PC$
4:       $R \leftarrow$ canonicalize ($CI \cup OP1 \cup OP2$)
5:    *(... cases for other instructions omitted ...)*
6:    default: trap to error handler

FIG-19

Algorithm 2 N - Policy Miss Handler

1: for i=1 to N do
2:    $M_i \leftarrow \{op, PC[i], CI[i], OP1[i], OP2[i], MR[i]\}$
3:    $\{pc_i, res_i\} \leftarrow policy_i (M_i)$
4: $PC_{new} \leftarrow$ canonicalize ($[pc_1, pc_2, ..., pc_N]$)
5: $R \leftarrow$ canonicalize ($[res_1, res_2, ..., res_N]$)

FIG-20

Algorithm 3 N - Policy Miss Handler with HW support

```
1:  for i=1 to N do
2:      M_i ← { op, PC[i], CI[i], OP1[i], OP2[i], MR[i] }
3:      {hit, pc_j, res_j} ← UCP-$ (i, M_i)
4:      if !hit then
5:          {pc_j, res_j} ← policy_i (M_i)
6:          insert {i, pc_j, res_j} into UCP-$
7:  pc[1...N] ← {pc_1, pc_2, ..., pc_N}
8:  {hit, PC_new} ← CTAG-$ (pc[1...N])
9:  if !hit then
10:     PC_new ← canonicalize (pc[1...N])
11:     insert {pc[1...N], PC_new} into CTAG-$
12: res[1...N] ← {res_1, res_2, ..., res_N}
13: {hit, R} ← CTAG-$ (res[1...N])
14: if !hit then
15:     R ← canonicalize (res[1...N])
16:     insert {res[1...N], R} into CTAG-$
```

FIG-21

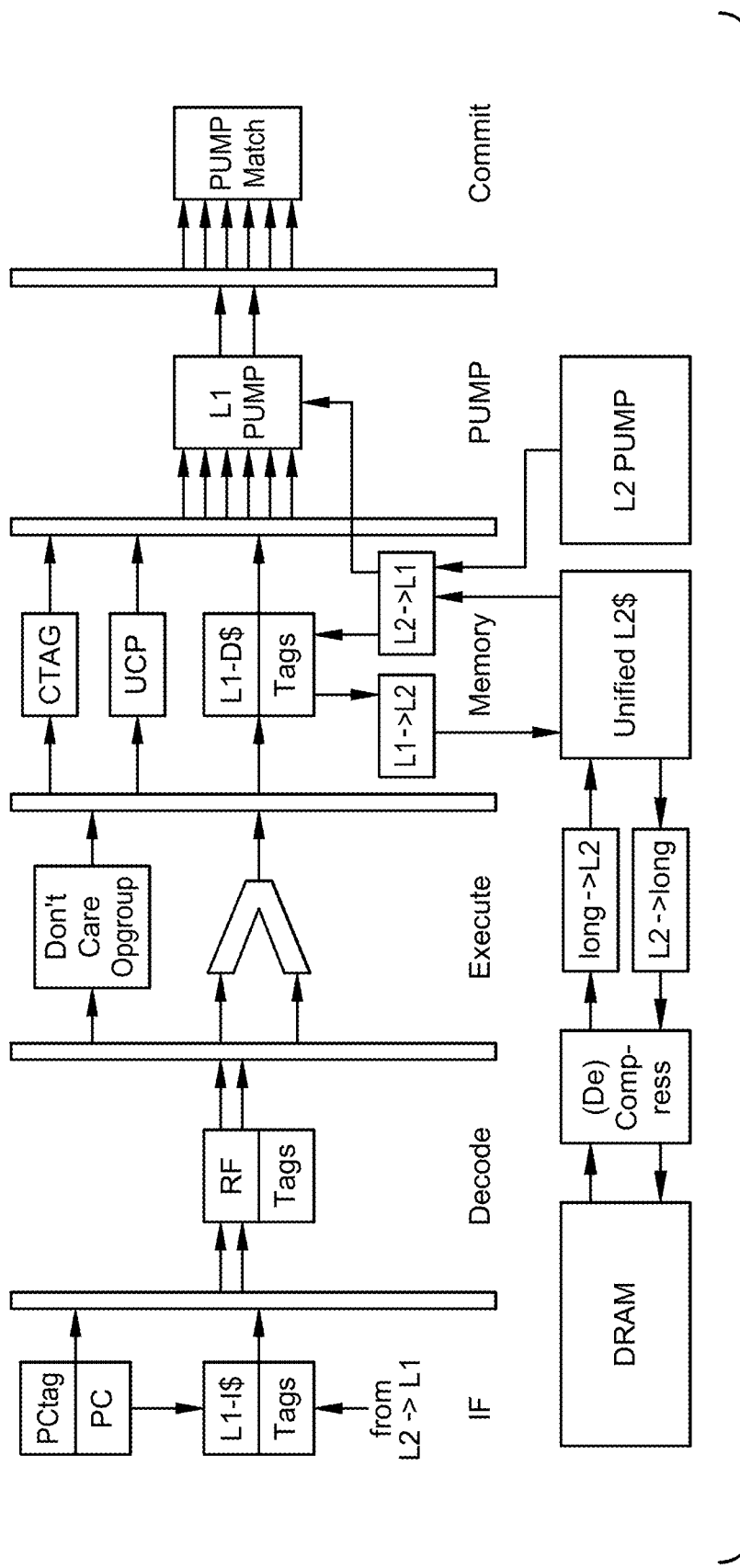

ial model, the
PROGRAMMABLE UNIT FOR METADATA PROCESSING

CROSS REFERENCE TO RELATED APPLICATION

This application claims priority from U.S. patent application Ser. No. 14/946,229 filed on Nov. 19, 2015 which claims the benefit of Provisional Application Ser. No. 62/081,891, filed on Nov. 19, 2014; the disclosures of which are incorporated herein by reference.

STATEMENT OF GOVERNMENT INTEREST

This invention was made with United States Government support under Contract No. FA8650-10-C-7090 awarded by the Department of the Air Force. The United States Government has certain rights in this invention.

BACKGROUND

Technical Field

The present disclosure relates generally to data processing and more particularly to a programmable units for metadata processing. Specifically, the present disclosure relates to a metadata processing unit that works in parallel with data flow to enforce an arbitrary set of policies, such that metadata is unbounded and software programmable to be applicable to a plurality of metadata processing policies.

Background Information

It is far too easy for attackers to subvert a program's intent. Modern processors, designed to be agnostic to the intended high-level semantics of the operations they perform, are complicit in this state of affairs—a legacy of the technology era when transistors were expensive and the primary design goal was runtime performance. With computer systems increasingly entrusted with critical tasks, system security has finally become a key design goal. At the same time, processors are now small compared to even modest system-on-a-chip dies, making it feasible and inexpensive to augment them with security-enhancing hardware. For tomorrow's computers to adequately protect the privacy and integrity of the data they manage, developers must re-architect the entire computing stack with security mechanisms consistent with modern threats and hardware costs.

The security literature offers a vast range of runtime policies that can reduce vulnerabilities due to malicious and erroneous code. These policies often encode high-level language abstractions (this is a numeric array, this is a code pointer, etc.) or user-level security invariants (this string came from the network) into metadata annotations on the program's data and code. High-level semantics or policies are enforced by propagating this metadata as computation proceeds and dynamically checking for violations at appropriate points. These are called low-level, fine-grained enforcement mechanisms micro-policies (or informally just "policies").

Today's computer systems are notoriously hard to secure, and conventional processor architectures are partly to blame, admitting behaviors (pointer forging, buffer overflows, and the like) that blatantly violate higher-level abstractions. The burden of closing the gap between programming language and hardware is left to software, where the cost of enforcing airtight abstractions is often deemed too high.

Software realizations of micro-policies can define arbitrary metadata and arbitrarily powerful computations over them. Software implementation facilitates fast deployment of new policies, but it can be prohibitively expensive in terms of runtime and energy costs (1.5×-10×), leading to unfavorable security-performance trade-offs. Simple micro-policies can be supported in hardware with low overhead. However, hardware customized to support a single policy can take years to deploy and is slow to adapt. Today's dynamic cyber-attack landscape calls for mechanisms that support rapid in-field responses to evolving threats.

Several recent efforts have demonstrated the value of propagating metadata during execution to enforce policies that catch safety violations and malicious attacks as they occur. These policies can be enforced in software, but typically with high overheads that discourage their deployment or motivate coarse approximations providing less protection. Hardware support for fixed policies can often reduce the overhead to acceptable levels and prevent a large fraction of today's attacks. Following this trend, Intel is adding hardware for bounds checking and isolation. While these mitigate many of today's attacks, fully securing systems will require more than memory safety and isolation. Some needs can already be identified (like control-flow integrity and information flow control) but the complete set remains unknown. Attacks rapidly evolve to exploit any remaining forms of vulnerability. What is needed is a flexible security architecture that can be quickly adapted to this ever-changing landscape. Some recent designs have made the hardware metadata computation configurable but have limited bits to represent metadata and only support a limited class of policies. A natural question, then, is: Is it possible to provide hardware to support extensible, software-defined metadata processing with low overhead? In particular, in the spirit of the $0\text{-}1^{-\infty}$ rule, can we efficiently support fine-grained, software-defined metadata propagation without placing a visible, hard bound on the number of bits allocated to metadata or a bound on the number of policies simultaneously enforced?

A need, therefore, exists for a means for automatically enforcing, at the instruction level, one or more arbitrarily/software defined security policies.

SUMMARY

To achieve this goal, a rich architectural model, the programmable Unit for Metadata Processing (PUMP) is introduced, that indivisibly associates a metadata tag with every word in the system's main memory, caches, and registers. To support unbounded metadata, the tag is large enough to direct to a data structure in memory. On every instruction, the tags of the inputs are used to determine if the operation is allowed, and if so to calculate the tags for the results. The tag checking and propagation rules are defined in software; however, to minimize performance impact, these rules are cached in a hardware structure, the PUMP rule cache, that operates in parallel with the arithmetic logic unit (ALU) portion of a processor. A software miss handler services cache misses based on the policy currently in effect.

The performance impact of the PUMP is measured using a composition of four different policies (See FIG. 14) that stress the PUMP in different ways and illustrate a range of security properties: (1) a Non-Executable Data and Non-Writable Code (NXD+NWC) policy that uses tags to distinguish code from data in memory and provides protection against simple code injection attacks; (2) a Memory Safety policy that detects all spatial and temporal violations in heap-allocated memory, extending with an effectively unlimited (260) number of colors ("taint marks"); (3) a Control-Flow Integrity (CFI) policy that restricts indirect control transfers to only the allowed edges in a program's control flow graph, preventing return-oriented-programming-style attacks (fine grained CFI is enforced, not coarse-grained approximations that are potentially vulnerable to attack); and (4) a fine-grained Taint Tracking policy (generalizing) where each word can potentially be tainted by multiple sources (libraries and 10 streams) simultaneously. Since these are well-known policies whose protection capabilities have been established in the literature, the present disclosure focuses on measuring and reducing the performance impact of enforcing them using the PUMP. Except for NXD+NWC, each of these policies needs to distinguish an essentially unlimited number of unique items; by contrast, solutions with a limited number of metadata bits can, at best, support only grossly simplified approximations. As might be expected, a simple, direct implementation of the PUMP is rather expensive. Adding pointer-sized (64 b) tags to 64 b words at least doubles the size and energy usage of all the memories in the system; rule caches add area and energy on top of this. For this simple implementation, an area overhead of 190% (See FIG. 16) was measured and geomean energy overhead around 220%; moreover, runtime overhead is disappointing (over 300%) on some applications. Such high overheads would discourage adoption, if they were the best that could be done.

However, the present disclosure finds that most policies exhibit spatial and temporal locality for both tags and the rules defined over them. The number of unique rules can be significantly reduced by defining them over a group of similar (or even identical) instructions, reducing compulsory misses and increasing the effective capacity of the rule caches. Off-chip memory traffic can be reduced by exploiting spatial locality in tags. On-chip area and energy overhead can be minimized by using a small number of bits to represent the subset of the pointer-sized tags in use at a time. Runtime costs of composite policy miss handlers can be decreased by providing hardware support for caching component policies. These optimizations allow the PUMP to achieve low overheads without compromising its rich policy model.

The solution involves enhancing memory words and internal processor state with metadata that can be used to encode an arbitrary number of security policies that can be enforced either in isolation or simultaneously; the present disclosure achieves this by adding to a "conventional" processor (e.g. RISC-CPU, GPU, Vector processor, etc.) a metadata processing unit (the PUMP) that works in parallel with the data flow to enforce an arbitrary set of policies; the present disclosure technique specifically makes the metadata unbounded and software programmable, such that the single solution of the present disclosure can be adapted and applied to a wide range of metadata processing policies. The PUMP could be integrated as a new/separate pipeline stage of a conventional (RISC) processor, or can be integrated as a stand-alone piece of hardware working on parallel with the "host" processor. For the former case, there is an instruction level simulator, elaborated policies, implementation optimizations and resource estimates, and extensive simulations to characterize the design.

Existing solutions trying to enforce policies at the fine (i.e. instruction) granularity level cannot enforce an arbitrary set of policies. Commonly, only a small number of fixed set of policies can be enforced at the instruction level. Enforcing policies at a higher granularity level (i.e. thread) cannot prevent certain classes of Return Oriented Programming attacks, thus rendering that type of enforcement limited in its usefulness. The solution of the present disclosure allows the expression of an unlimited number of policies (the only limit is the size address space, as the meta-data is expressed in terms of address pointers that can point to any arbitrary data structures) that could be enforced at the instruction level singly or simultaneously.

In one aspect, an exemplary non-limiting embodiment may provide a computer-implemented method for metadata processing, comprising executing on a processor the steps of: encoding a number of security policies in a data flow with logic architecture on the processor; introducing a programmable metadata processing unit (PUMP) working in parallel with the data flow; moving metadata through the PUMP; enforcing a set of policies such that the metadata is unbounded and software programmable and adapted to be applicable to a plurality of metadata processing policies.

In another aspect, an exemplary non-limiting embodiment may provide a system for processing metadata free from a bound on a number of bits allocated to metadata and free from a bound on a number of policies simultaneously enforced comprising: a processor having an in-order implementation with a dataflow pipeline including a memory stage and a writeback stage; a Programmable Unit for Metadata Processing (PUMP) into the processor pipeline interposed between the memory stage and the write back stage.

In yet another aspect, an exemplary non-limiting embodiment may provide a method for metadata processing comprising the steps of: encoding an arbitrary number of security policies with a Reduced Instruction Set Computer (RISC) architecture on a conventional processor; and adding a metadata processing unit (PUMP) that works in parallel with data flow to enforce an arbitrary set of policies, such that metadata is unbounded and software programmable to be applicable to a plurality of metadata processing policies.

BRIEF DESCRIPTION OF THE SEVERAL VIEWS OF THE DRAWINGS

A sample embodiment of the present disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the present disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 11A is a series of shaded graphs depicting runtime overhead impact of tag bit length and UCP-$ capacity for different representative benchmarks;

FIG. 14 is a first table labeled "TABLE 1" providing a summary of investigated policies;

FIG. 15 is a second table labeled "TABLE 2" providing a summary of taxonomy of tagging schemes;

FIG. 16 is a third table labeled "TABLE 3" providing a summary of memory resource estimates for the baseline and the simple PUMP-extended processor;

FIG. 17 is a fourth table labeled "TABLE 4" providing a summary of PUMP parameter ranges used in experiments;

FIG. 18 is a fifth table labeled "TABLE 5" providing a summary of memory resource estimates for the PUMP-optimized processor;

FIG. 19 is a first algorithm labeled "Algorithm 1" providing a summary of the taint tracking miss handler;

FIG. 20 is a second algorithm labeled "Algorithm 2" providing a summary of the N-policy miss handler;

FIG. 21 a third algorithm labeled "Algorithm 3" providing a summary of the N-policy miss handler with HW support;

FIG. 24 is a schematic view, similar to FIG. 1, showing an exemplary PUMP cache integrated as a pipeline stage in a processor pipeline and its opgroup translation, UCP and CTAG caches.

Similar numbers refer to similar parts throughout the drawings.

DETAILED DESCRIPTION

Figure 1:
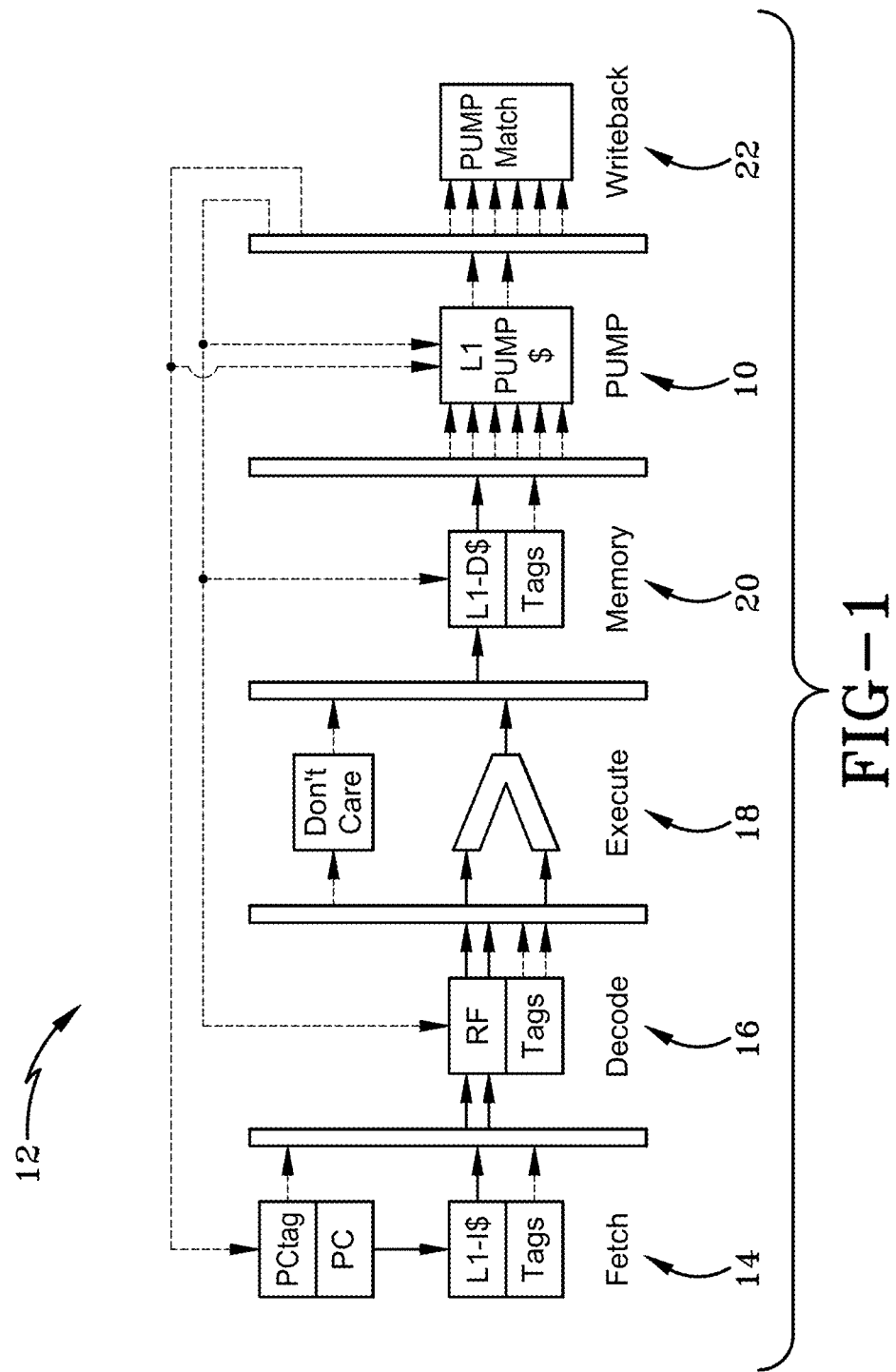
FIG. 1 is a schematic drawing showing an exemplary PUMP cache integrated as a pipeline stage in a processor pipeline.

As depicted in FIG. 1, a Programmable Unit for Metadata Processing (PUMP) 10 is integrated into a conventional Reduced Instruction Set Computing or Computer (RISC) processor 12 with an in-order implementation and a 5-stage pipeline suitable for energy-conscious applications, which effectively transforms into a 6-stage pipeline with the addition of PUMP 10. A first stage is a fetch stage 14, a second stage is a decode stage 16, a third stage is an execute stage 18, a fourth stage is a memory stage 20, and a fifth stage is a writeback stage 22. Pump 10 is interposed between the memory stage 20 and the writeback stage 22.

The PUMP 10 is electronic logic that is a mechanism that provides policy enforcement and metadata propagation. PUMP 10 is characterized by and allows the following to occur: (i) an empirical evaluation of the runtime, energy, power ceiling, and area impacts of a simple implementation of the PUMP 10 on a standard set of benchmarks under four diverse policies and their combination; (ii) a set of micro-architectural optimizations; and (iii) measurements of the gains from these optimizations, showing typical runtime overhead under 10%, a power ceiling impact of 10%, and typically energy over-head under 60% by using 110% additional area for on-chip memory structures. "Logic", as used herein, includes but is not limited to hardware, firmware, software and/or combinations of each to perform a function (s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

PUMP 10 may be an extension to a conventional RISC processor 12. The subsections provide below detail the ISA-level extensions that constitute the PUMP's 10 hardware interface layer, the basic micro-architectural changes, and the accompanying low-level software.

Metadata Tags

Every word in a PUMP-enriched system of the present disclosure is associated with a pointer-sized tag. These tags are uninterpreted at the hardware level. At the software level, a tag may represent metadata of unbounded size and complexity, as defined by the policy. Simpler policies that need only a few bits of metadata may store the metadata directly in the tag; if more bits are required, then indirection is used to store the metadata as a data structure in memory, with the address of this structure used as the tag. Notably, these pointer-sized tags are one exemplary aspect of the present disclosure and are not to be considered limiting. The basic addressable memory word is indivisibly extended with a tag, making all value slots, including memory, caches, and registers, suitably wider. A program counter is also tagged. This notion of software-defined metadata and its representation as a pointer-sized tag extends previous tagging approaches, where only a few bits are used for tags and/or they are hardwired to fixed interpretations. Some exemplary taxonomies of tagging schemes are presented in Table 2 which is reproduced in FIG. 15.

Metadata tags are not addressable by user programs. Rather, the metadata tags are addressed by policy handlers invoked on rule cache misses as detailed below. All updates to tags are realized through PUMP 10 rules.

Tag-Propagation Rules

Besides unbounded metadata, another feature of the PUMP 10 is hardware support for single-cycle common-case computation on metadata. These computations are defined in terms of rules of the form opcode: (PC, CI, OP1, OP2, MR)⇒(PC$_{new}$, R), which should be read: "If the current opcode is opcode, the current tag on the program counter is PC, the tag on the current instruction is CI, the tags on its input operands (if any) are OP1 and OP2, and the tag on the memory location (in case of load/store) is MR, then the tag on the program counter in the next machine state should be PC$_{new}$ and the tag on the instructions result (a destination register or a memory location, if any) should be R". This rule format, allowing two output tags to be computed from up to five input tags, is markedly more flexible than those considered in prior work, which typically compute one output from up to two inputs (see Table 2 in FIG. 15). Beyond previous solutions that only track data tags (OP1, OP2, MR, R), the present disclosure provides a current instruction tag (CI) that can be used to track and enforce provenance, integrity, and usage of code blocks; as well as a PC tag that can be used to record execution history, ambient authority, and "control state" including implicit information flows. The CFI policy exploits the PC tag for recording the sources of indirect jumps and the CI tag for identifying jump targets, NXD+NWC leverages the CI to enforce that data is not executable, and Taint Tracking uses the CI to taint data based on the code that produced it.

Rule Cache

To resolve the rules in a single cycle in the common case, the present disclosure provides a hardware cache of the most recently used rules. Depending on the instruction and policy, one or more of the input slots in a given rule may be unused. To avoid polluting the cache with rules for all possible values of the unused slots, the rule-cache lookup logic refers to a bit vector containing a "don't-care" (See FIG. 1) bit for each input slot—opcode pair, which determines whether the corresponding tag is actually used in the rule cache lookup. To handle these "don't care" inputs efficiently, they are masked out before presenting the inputs to the PUMP 10. The don't-care bit vectors are set by a privileged instruction as part of the miss handler installation.

Pipeline Integration

FIG. 1 depicts how the present disclosure revises the 5-stage processor 12 pipeline to incorporate the PUMP 10 hardware. The rule cache lookup is added as an additional stage and bypass tag and data independently so that the PUMP 10 stage does not create additional stalls in the processor pipeline.

Placing the PUMP 10 as a separate stage (between memory stage 20 and writeback stage 22) is motivated by the need to provide the tag on the word read from memory (load), or to be overwritten in memory (store), as an input to the PUMP 10. Since rules are allowed that depend on the existing tag of the memory location that is being written, write operations become read-modify-write operations. The existing tag is read during the Memory stage 20 like a read rule, the read rule is checked in the PUMP 10 stage, and the write is performed during the Commit stage which may also be referred to as writeback stage 22. As with any caching scheme, multiple levels of caches may be used for the PUMP 10. This disclosure presents two levels of caches. The extension to multiple levels of caches is readily apparent to one having ordinary skill in the art.

Miss Handler

In one non-limiting example, when a last-level miss occurs in the rule cache in the writeback stage 22, it is handled as follows: (i) the current opcode and tags are saved in a (new) set of processor registers used only for this purpose, and (ii) control is transferred to the policy miss handler (described in more detail below), which (iii) decides if the operation is allowed and if so generates an appropriate rule. When the miss handler returns, the hardware (iv) installs this rule into the PUMP 10 rule caches, and (v) re-issues the faulting instruction. To provide isolation between the privileged miss handler and the rest of the system software and user code, a miss-handler operational mode is added to the processor, controlled by a bit in the processor state that is set on a rule cache miss and reset when the miss handler returns. To avoid the need to save and restore registers on every rule cache miss, the integer register file may be expanded with 16 additional registers that are available only to the miss handler. Additionally, the rule inputs and outputs appear as registers while in miss handler mode (cf. register windows), allowing the miss handler (but nothing else) to manipulate the tags as ordinary values.

A new miss-handler-return instruction is added to finish installing the rule into the PUMP 10 rule caches and returns to user code. In this particular non-limiting example, this instruction can only be issued when in miss-handler mode. While in miss-handler mode, the rule cache is ignored and the PUMP 10 instead applies a single, hardwired rule: all instructions and data touched by the miss handler must be tagged with a predefined MISSHANDLER tag, and all instruction results are given the same tag. In this way, the PUMP 10 architecture prevents user code from undermining the protection provided by the policy. Alternatively, the PUMP may be used to enforce flexible rules on miss-handler access. Tags are not divisible, addressable, or replaceable by user code; metadata data structures and miss handler code cannot be touched by user code; and user code cannot directly insert rules into the rule cache.

Algorithm 1 depicted in FIG. 19 illustrates the operation of the miss handler for a taint-tracking policy. To minimize the number of distinct tags (and hence rules), the miss handler uses a single tag for logically equivalent metadata by "canonicalizing" any new data structures that it builds.

Rather than forcing users to choose a single policy, multiple policies are enforced simultaneously and new ones are added later. An exemplary advantage to these "unbounded" tags is that they can enforce any number of policies at the same time. This can be achieved by letting tags be pointers to tuples of tags from several component policies. For example, to combine the NXD+NWC policy with the taint-tracking policy, each tag can be a pointer to a tuple (s, t), where s is a NXD+NWC tag (either DATA or CODE) and t is a taint tag (a pointer to a set of taints). The rule cache lookup is similar, however when a miss occurs, both component policies are evaluated separately: the operation is allowed only if both policies allow it, and the resulting tags are pairs of results from the two component policies. However, in other embodiments, it might be possible to express how the policies are to be combined (not simply as AND between all the constituent components).

Figure 4A:
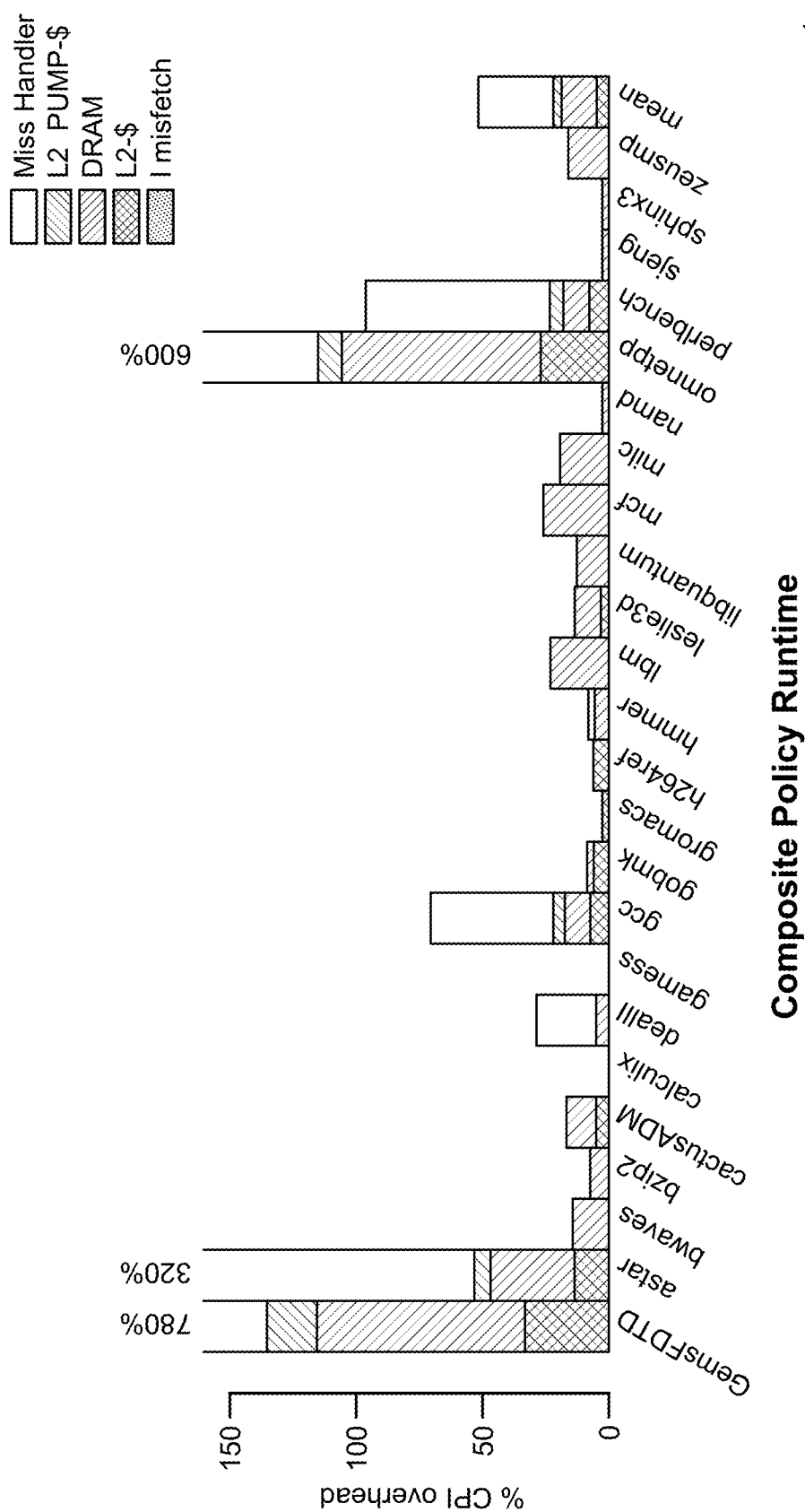
FIG. 4A is a series of bar graphs showing composite policy runtime overhead of simple implementation with 64 b Tags, wherein the composite policy enforces simultaneously the following policies (i) spatial and temporal memory safety, (ii) taint tracking, (iii) control-flow integrity, and (iv) code and data separation.

Algorithm 2 depicted in FIG. 20 illustrates the general behavior of the composite miss handler for any N policies. Depending on how correlated the tags in the tuple are, this could result in a large increase in the number of tags and hence rules. In order to demonstrate the ability to support multiple policies simultaneously and measure its effect on working set sizes, a composite policy ("Composite") was implemented through experimentation and where the composite policy comprises all four policies described above. The Composite policy represents the kind of policy workloads that are supported which are described in further detail below. As seen in FIG. 4A and FIG. 20, the composite policy enforces simultaneously the following policies (i) spatial and temporal memory safety, (ii) taint tracking, (iii) control-flow integrity, and (iv) code and data separation Most policies will dispatch on the opcode to select the appropriate logic. Some policies, like NXD+NWC, will just check whether the operation is allowed. Others may consult a data structure (e.g., the CFI policy consults the graph of allowed indirect call and return ids). Memory safety checks equality between address color (i.e pointer color) and memory region colors. Taint tracking computes fresh result tags by combining the input tags (Alg. 1). Policies that must access large data structures (CFI) or canonicalize across large aggregates (Taint Tracking, Composite) may make many memory accesses that will miss in the on-chip caches and go to DRAM. On average across all of the benchmarks, servicing misses for NXD+NWC required 30 cycles, Memory Safety required 60 cycles, CFI required 85 cycles, Taint Tracking required 500 cycles, and Composite required 800 cycles.

If the policy miss handler determines that the operation is not allowed, it invokes a suitable security fault handler. What this fault handler does is up to the runtime system and the policy; typically, it would shut down the offending process, but in some cases it might return a suitable "safe value" instead. For incremental deployment with UNIX-style operating systems, assumed policies are applied per process, allowing each process to get a different set of policies. The recitation of being applied per process is non-limiting but rather exemplary and one having skill in the art recognizes this. It also allows us to place the tags, rules, and miss handling support into the address space of the process, avoiding the need for an OS-level context switch. Longer term, perhaps PUMP policies can be used to protect the OS as well.

Evaluation of Simple Implementation

The following details evaluation methodology for measuring runtime, energy, area, and power overheads and applies it on a simple implementation of the PUMP hardware and software, using 128 b words (64 b payload and 64 b tag) and the modified pipeline processor 12 depicted in FIG. 1. It is useful to describe and measure the simple PUMP implementation first, even though the optimized implementation is the version to which the overheads (relative to the baseline processor) is ultimately desired. Both are described because it details basic versions of the key mechanisms before getting to more sophisticated versions.

Resource Estimates

To estimate the physical resource impact of the PUMP, memory costs were primarily focused on, since the memories are the dominant area and energy consumers in a simple RISC processor and in the PUMP hardware extensions. A 32 nm Low Operating Power (LOP) process is considered for the L1 memories (See FIG. 1) and Low Standby Power (LSTP) for the L2 memories and use CACTI 6.5 for modeling the area, access time, energy per access, and static (leakage) power of the main memory and the processor on-chip memories.

Baseline Processor

A baseline processor (no-PUMP) has separate 64 KB L1 caches for data and instructions and a unified 512 KB L2 cache. Delay-optimized L1 caches and an energy-optimized L2 cache were used. All caches use a writeback discipline. The baseline L1 cache has a latency around 880 ps; it is assumed that it can return a result in one cycle and set its clock to 1 ns, giving a 1 GHz-cycle target—comparable to modern embedded and cell phone processors. The parameters for this processor are presented in Table 3 in FIG. 16.

Pump Implementation

The PUMP extended processor 10 hardware implementation has two parts: extending all architectural states in stages 14, 16, 20 with tags, and adding PUMP rule caches 10 to the extended processor 12. Extending each 64 b word in the on-chip memories with a 64 b tag increases their area and energy per access and worsens their access latency. This is potentially tolerable for the L2 cache, which already has a multi-cycle access latency and is not used every cycle. But adding an extra cycle of latency to access the L1 caches (See FIG. 1) can lead to stalls in the pipeline. To avoid this, in this simple implementation the effective capacity of the L1 caches is reduced to half of those in the baseline design and then add tags; this gives the same single-cycle access to the L1 caches, but can degrade performance due to increased misses.

Figure 22:
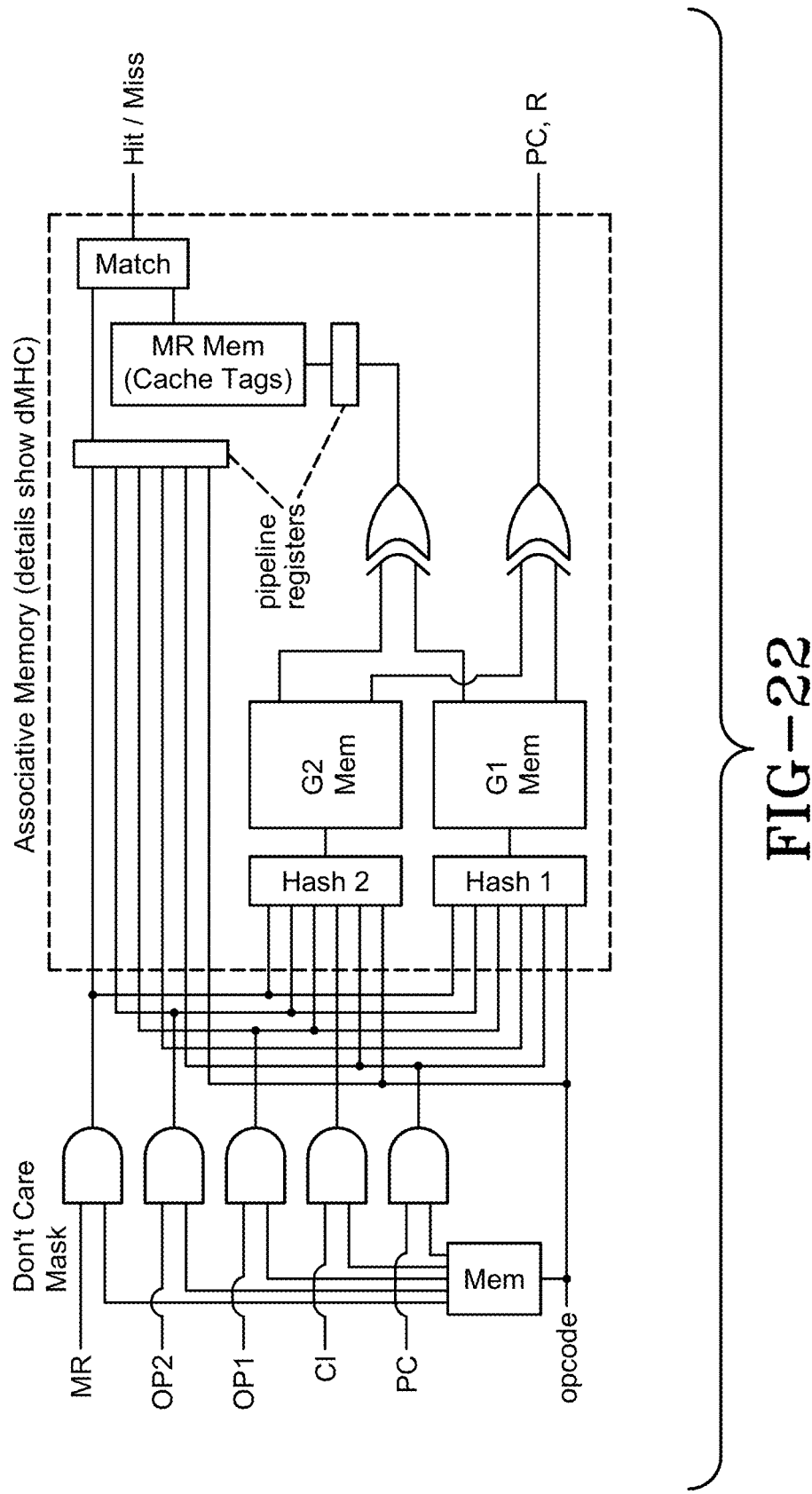
FIG. 22 is schematic view of the PUMP rule cache dataflow and microarchitecture.

The PUMP rule cache 10 requires a long match key (5 pointer-sized tags plus an instruction opcode, or 328 b) compared to a traditional cache address key (less than the address width), and return a 128 b result. Using a fully associative L1 rule cache would lead to high energy and delay (See Table 3 in FIG. 16). Instead, a multi-hash cache scheme inspired with four hash functions is utilized, as depicted in FIG. 22. The L1 rule cache is designed to produce a result in a single cycle, checking for a false hit in the second cycle, while the L2 rule cache is designed for low energy, giving a multi-cycle access latency. Again, Table 3 in FIG. 16 shows the parameters for 1024-entry L1 and 4096-entry L2 rule caches used in the simple implementation. When these caches reach capacity, a simple first-in-first out (FIFO) replacement policy is used, which appears to work well in practice for the current workloads (FIFO is within 6% of LRU here).

Evaluation Methodology

Figure 2:
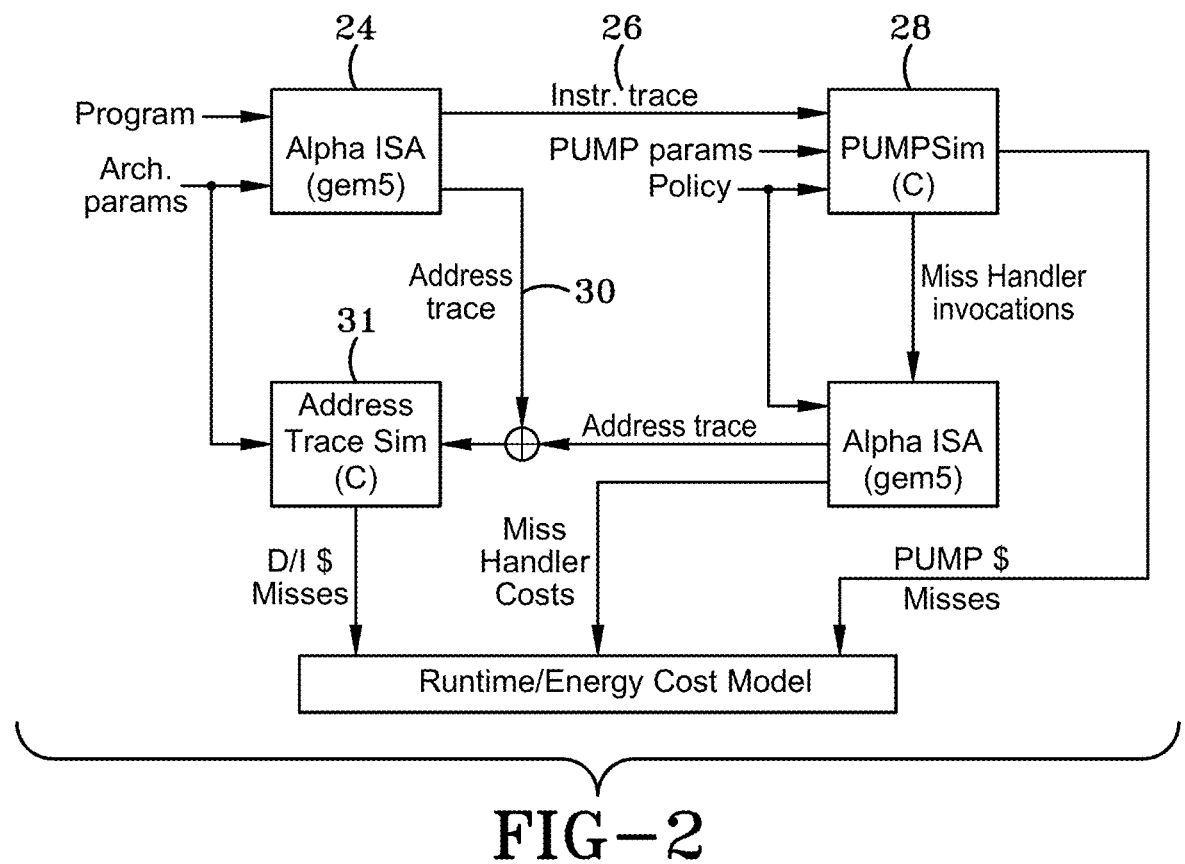
FIG. 2 is a schematic drawing showing a PUMP Evaluation Framework.

As depicted in FIG. 2, the estimation of the performance impact of the PUMP, identifies a combination of ISA, PUMP, and address-trace simulators. A gem5 simulator 24 generates instruction traces for the SPEC CPU2006 programs (omitting xalancbmk and tonto, on which gem5 fails) on a 64-bit Alpha baseline ISA. Each program simulates for each of the four policies listed above and the composite policy for a warm-up period of 1 B instructions and then evaluates the next 500M instructions. In gem5 simulator 24, each benchmark is run on the baseline processor with no tags or policies. The resulting instruction trace 26 is then run through a PUMP simulator 28 that performs metadata computation for each instruction. This "phased" simulation strategy is accurate for fail-stop policies, where the PUMP's results cannot cause a program's control flow to diverge from its baseline execution. While address-trace simulations can be inaccurate for highly pipelined and out-of-order processors, they are quite accurate for the simple, in-order, 5- and 6-stage pipeline. On the baseline configuration, the gem5 instruction simulation and address trace generation 30 followed by custom address-trace simulations in address simulator 32 and accounting were within 1.2% of gem5's cycle-accurate simulations.

The PUMP simulator 28 includes miss-handler code (written in C) to implement each policy, and metadata tags are assigned on the initial memory depending on the policy. The PUMP simulator 28 allows captures the access patterns in the PUMP 10 rule caches and estimates the associated runtime and energy costs, accounting for the longer wait cycles required to access the L2 rule cache. Since the PUMP simulator 28 having miss handler code also runs on the processor, separate simulations for the miss handler on gem5 to capture its dynamic behavior. Since the miss-handler code potentially impacts the data and instruction caches, a merged address trace is created that includes properly interleaved memory accesses from both user and miss-handler code, which is used for the final address-trace simulation to estimate the performance impact of the memory system.

Simple Implementation

The evaluation of the simple PUMP implementation is provided, comparing it to the no-PUMP baseline.

Area Overhead

The overall area overhead of the PUMP 10 on top of the baseline processor is 190% (See Table 3 in FIG. 16). The dominant portion of this area overhead (110%) comes from the PUMP 10 rule caches. The unified L2 cache contributes most of the remaining area overhead. The L1 D/I caches stay roughly the same, since their effective capacity is halved. This high memory area overhead roughly triples the static power, contributing to 24% of the energy overhead.

Runtime Overhead

Figure 3A:
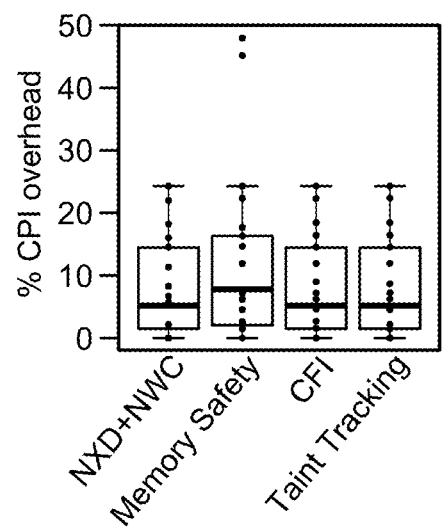
FIG. 3A is a graph showing performance results for a single runtime policy with simple implementation using the evaluation framework depicted in FIG. 2.

For all single policies on most benchmarks, the average runtime overhead of even this simple implementation is only 10% (see FIG. 3A and FIG. 3B; to read boxplots: bar is the median, box covers one quartile above and below (middle 50% of cases), dots represent each individual data point, whiskers denote full range except for outliers (more than 1.5× respective quartile)), with the dominant overhead coming from the additional DRAM traffic required to transfer tag bits to and from the processor. For the Memory Safety policy (FIG. 3A and FIG. 3B), there are a few benchmarks that exhibit high miss handler overhead, pushing their total overhead up to 40-50% due to compulsory misses on newly allocated memory blocks. For the Composite policy Runtime (labeled as "CPI" or "CPI Overhead" in the Figures), five of the benchmarks suffer from very high overheads in the miss handler (See FIG. 4A), with the worst case close to 780% in the GemsFTDT and the geomean reaching 50%. For the Composite policy Energy (labeled as "EPI" or "EPI Overhead" in the Figures) depicted in FIG. 4B, three of the benchmarks (i.e. GemsFTDT, astar, omnetpp) suffer from very high overheads in the miss handler, with the worst case close to 1600% in the GemsFTDT, 600% in the astar, and 520% in the omnetpp.

Two factors contribute to this overhead: (1) the large number of cycles required to resolve a last-level rule cache miss (since every component miss handler must be consulted), and (2) an explosion in the number of rules, which expands the working set size and increases the rule cache miss rate. In the worst case, the number of unique composite tags could be the product of the unique tags in each component policy. However, the total rules increase by a factor of 3×-5× over the largest single policy, Memory Safety.

Energy Overhead

Figure 3B:
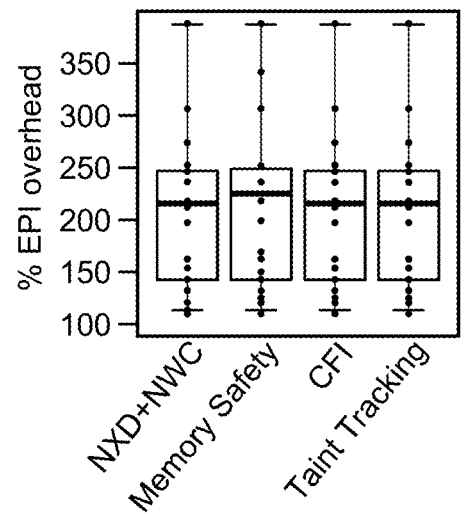
FIG. 3B is a graph showing performance results of multiple single energy policies with simple implementation.
Figure 4B:
FIG. 4B is a series of bar graphs showing composite policy energy overhead of simple implementation with 64 b Tags.

Moving more bits, due to wider words, and executing more instructions, due to miss handler code, both contribute to energy overheads, impacting both the single and composite policies (FIG. 3B and FIG. 4B). The CFI and Memory Safety policies—and hence also the Composite policy—access large data structures that often require energy-expensive DRAM accesses. The worst-case energy overhead is close to 400% for single policies, and about 1600% for the Composite policy, with geomean overhead around 220%.

Power Ceiling

Figure 4C:
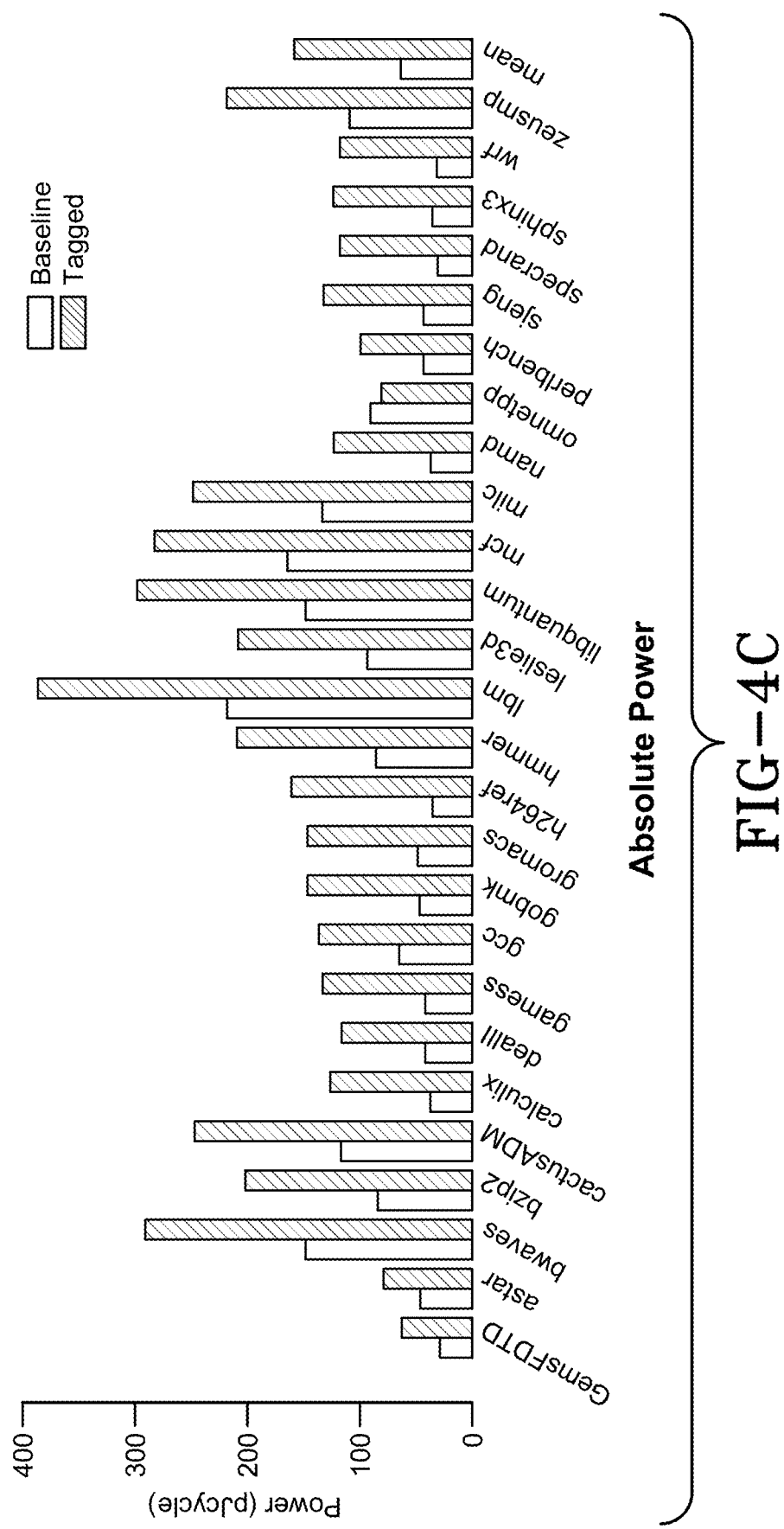
FIG. 4C is a series of bar graphs showing power ceilings with simple implementation compared to a baseline.

For many platform designs the worst-case power, or equivalently, energy per cycle, is the limiter. This power ceiling may be driven by the maximum current the platform can draw from a battery or the maximum sustained operating temperature either in a mobile or in a wired device with ambient cooling. FIG. 4C shows that the simple implementation raises the maximum power ceiling by 76% with Ibm driving the maximum power in both the baseline and simple PUMP implementations. Note that this power ceiling increase is lower than the worst-case energy overhead in part because some benchmarks slow down more than the extra energy they consume and in part because the benchmarks with high energy overhead are the ones consuming the least absolute energy per cycle in the baseline design. Typically the data working set of these energy-efficient programs fits into the on-chip caches, so they seldom pay the higher cost of DRAM accesses.

Optimizing the Pump

The implementation described above achieves reasonable performance on most benchmarks, the runtime overhead for the Composite policy on some of them and the energy and power overheads on all policies and benchmarks seem unacceptably high. To address these overheads, a series of targeted microarchitecture optimizations is introduced. In Table 4 at FIG. 17, these optimizations are examined for the impact of the architectural parameters associated with the PUMP components on the overall costs. Groupings of opcodes with identical rules are used to increase the effective capacity of the PUMP rule caches, tag compression to reduce the delay and energy of DRAM transfers, short tags to reduce the area and energy in on-chip memories, and Unified Component Policy (UCP) and Composition Tag (CTAG) caches to decrease the overheads in the miss handlers.

Opgroups

Figure 5A:
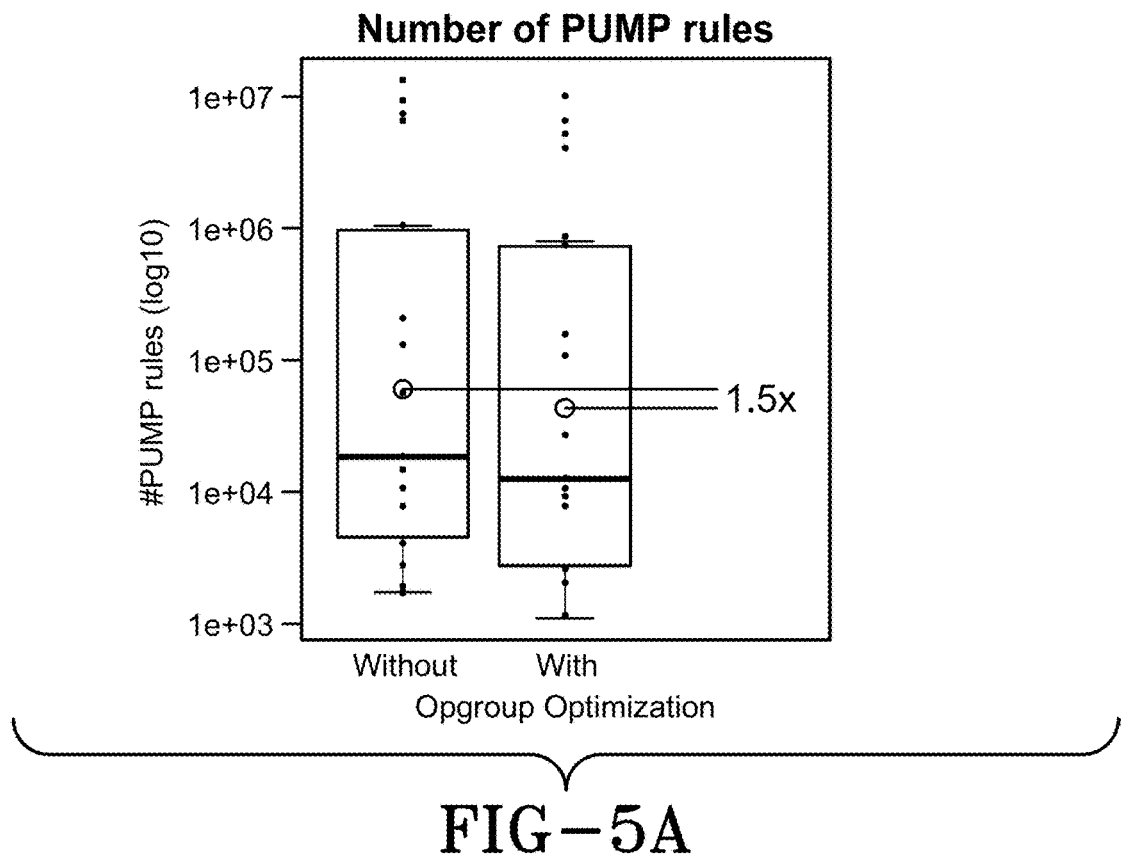
FIG. 5A is a comparative bar graph of the number of PUMP rules without opgroup optimization and with opgroup optimization.
Figure 5B:
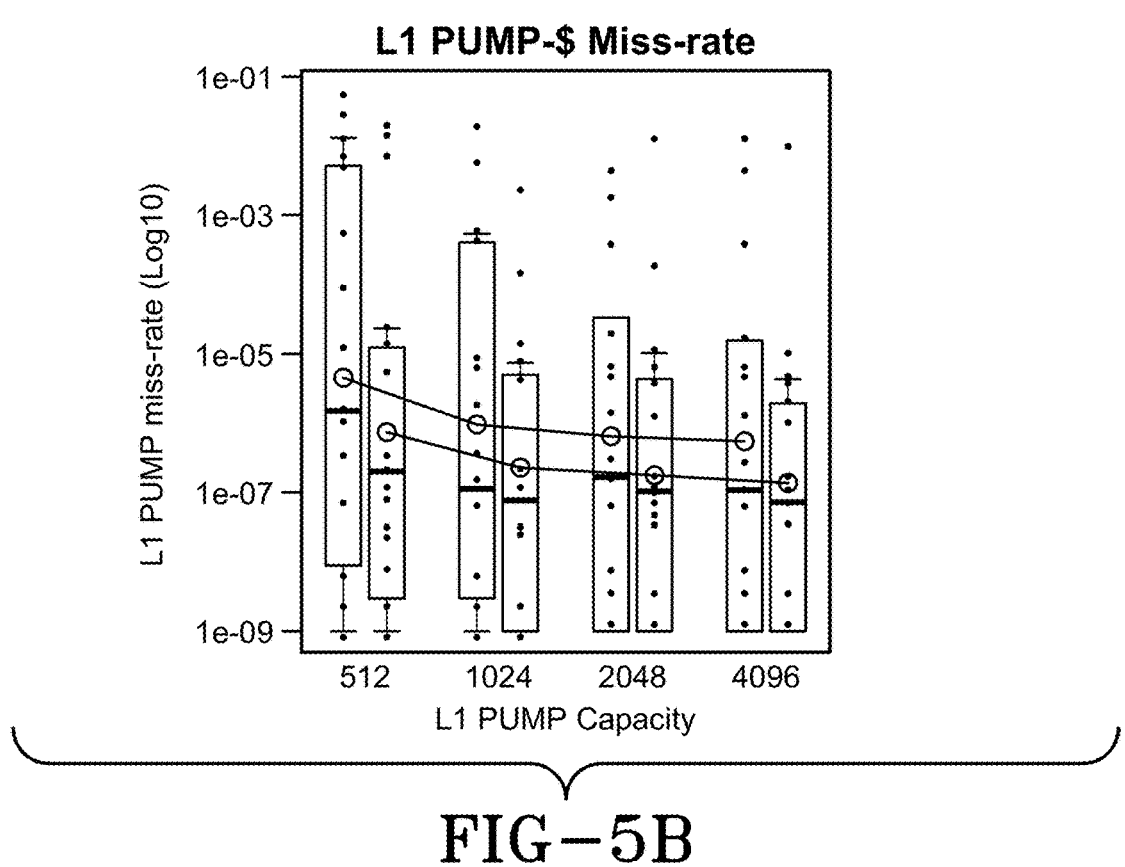
FIG. 5B is a series of graphs showing the impact of miss rates of different opgroup optimizations based on PUMP capacity.

In practical policies, it is common to define similar rules for several opcodes. For example, in the Taint Tracking policy, the rules for the add and sub instructions are identical (See Algorithm 1 in FIG. 19). However, in the simple implementation, these rules occupy separate entries in the rule caches. Based on this observation, instruction operation codes ("opcodes") are grouped with the same rules into "opgroups", reducing the number of rules needed. Which opcodes can be grouped together depends on the policy; therefore the "don't-care" SRAM is expanded in the Execute stage 18 (FIG. 1) to also translate opcodes to opgroups before the rule cache lookup. For the Composite policy, over 300 Alpha opcodes are reduced to 14 opgroups and the total number of rules by a factor of 1.1×-6×, with an average of 1.5× (FIG. 5A measures this effect across all the SPEC benchmarks). This effectively increases the rule cache capacity for a given investment in silicon area. Opgroups also reduce the number of compulsory misses, since a miss on a single instruction in the group installs the rule that applies to every instruction opcode in the group. FIG. 5B summarizes the miss-rate across all the SPEC benchmarks for different L1 rule cache sizes for the Composite policy with and without opgrouping. FIG. 5B shows that both the range and the mean of the miss-rates are reduced by opgrouping. Particularly, a 1024-entry rule cache after opgroup optimization has a lower miss rate than a 4096-entry rule cache without it. A lower miss-rate naturally reduces the time and energy spent in miss handlers (See FIG. 12A and FIG. 12B) and smaller rule caches directly reduce area and energy.

Main Memory Tag Compression

Figure 6A:
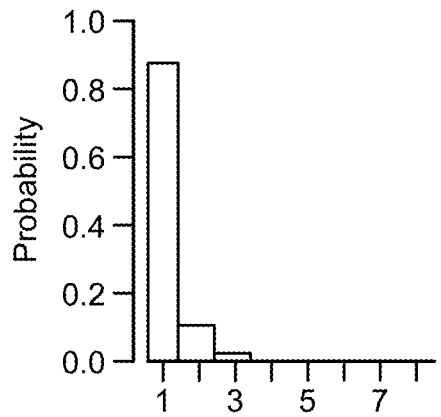
FIG. 6A is a graph of the distribution of unique tags for each DRAM transfer for the gcc benchmark with the composite policy, showing that most cache line have the same tag.

Using 64 b tags on 64 b words doubles the off-chip memory traffic and therefore approximately doubles the associated energy. Typically, though, tags exhibit spatial locality—many adjacent words have the same tag. For example, FIG. 6A plots the distribution of unique tags for each DRAM transfer for the gcc benchmark with the Composite policy, showing that most words have the same tag: on average there are only about 1.14 unique tags per DRAM transfer of an 8-word cache line. This spatial tag locality is exploited to compress the tag bits that must be transferred to and from the off-chip memory. Since the processor is transferring data in cache lines, the cache lines are used as the basis for this compression. 128 B per cache line are allocated in the main memory, to keep addressing simple.

Figure 6B:
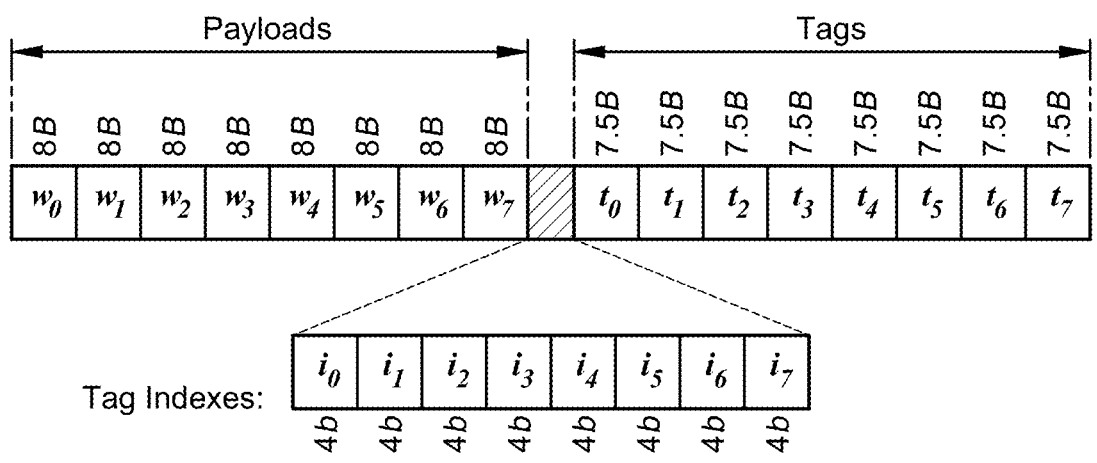
FIG. 6B is a diagram showing the main memory tag compression.

However, as depicted in FIG. 6B rather than storing 128 b tagged words directly, eight 64 b words (payloads) are stored, followed by eight 4 b indexes, and then up to eight 60 b tag. The index identifies which of the 60 b tags goes with the associated word. The tag is trimmed to 60 b to accommodate the indexes, but this does not compromise the use of tags as pointers: assuming byte addressing and 16 B (two 64 b words) aligned metadata structures, the low 4 b of the 64 b pointer can be filled in as zeros. As a result, after transferring the 4 B of indexes, all that remains is the need to transfer the unique 7.5 B tags in the cache line. For instance, if the same tag is used by all the words in the cache line then there is a transfer of 64 B+4 B=68 B in a first read, then 8 B in a second read for a total of 76 B instead of 128 B. The 4 b index can be either a direct index or a special value. A special index value is defined to represent a default tag, so that there is no need to transfer any tag in this case. By compressing tags in this manner, the average energy overhead per DRAM transfer is reduced from 110% to 15%.

The compression scheme presented above is preferred for its combination of simplicity and effectiveness at reducing off-chip memory energy. One having skill in the art clearly recognizes that many clever schemes for fine-grained memory tagging exist—including multi-level tag page tables, variable-grained TLB-like structures, and range caches—and these could also be used to reduce the DRAM footprint.

Tag Translation

With continued reference to FIG. 1, the simple PUMP rule caches are large (adding 110% area) since each cached rule is 456 b wide. Supporting the PUMP 10 also required extending the baseline on-chip memories (RFs and L1/L2 caches) with 64 b tags. Using a full 64 b (or 60 b) tag for each 64 b word here incurs heavy area and energy overheads. However, a 64 KB L1-D$ holds only 8192 words and hence at most 8192 unique tags. Along with a 64 KB L1-I$, there may be at most 16384 unique tags in the L1 memory subsystem; these can be represented with just 14 b tags, reducing the delay, area, energy, and power in the system. Caches (L1, L2) exist to exploit temporal locality, and this observation suggests that locality can be leveraged to reduce area and energy. If the tag bits are reduced to 14 b, the PUMP rule cache match key is reduced from 328 b to 78 b.

To get these savings without losing the flexibility of full, pointer-sized tags, different-width tags are used for different on-chip memory subsystems and translate between these as needed. For example, one might use 12 b tags in the L1 memories and 16 b tags in the L2 memories.

Figure 7A:
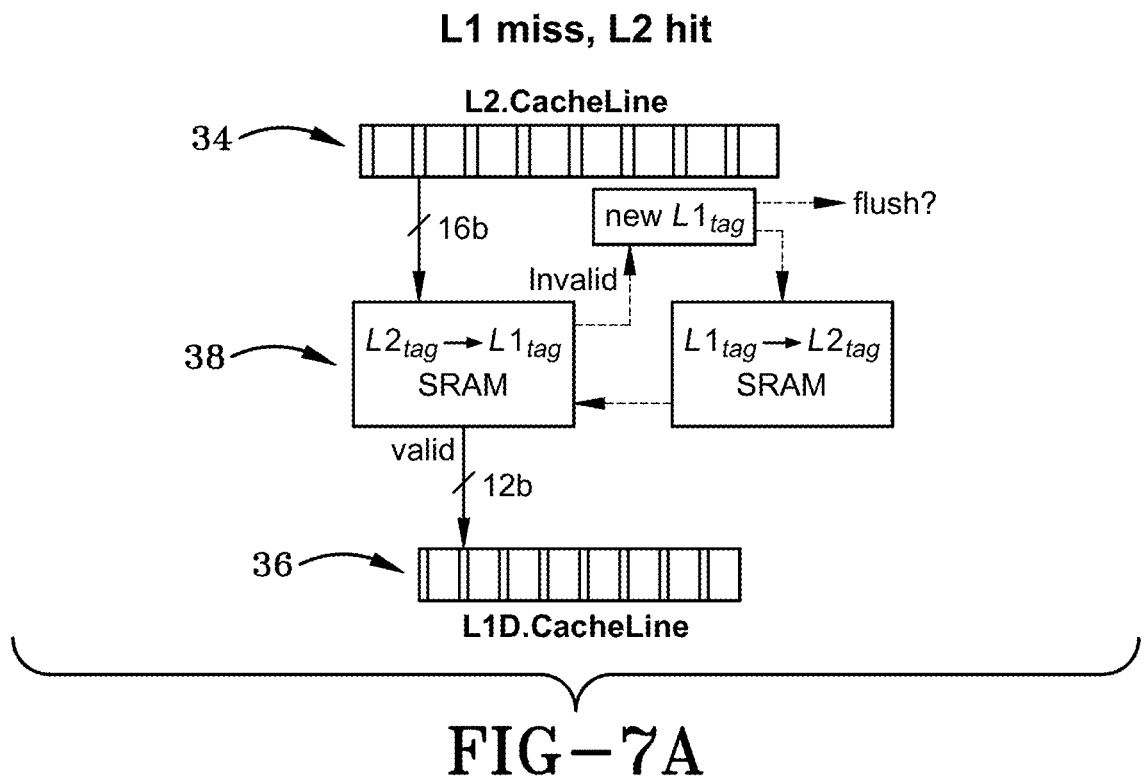
FIG. 7A is a schematic drawings showing translation between 16 b L2 tags and 12 b L1 tags.

FIG. 7A details how tag translation is managed between L1 and L2 memory subsystems. Moving a word from L2 cache 34 to L1 cache 36 requires translating its 16 b tag to the corresponding 12 b tag, creating a new association if needed. A simple SRAM 38 for the L2-tag-to-L1-tag translation, with an extra bit indicating whether or not there is an L1 mapping for the L2 tag.

Figure 7B:
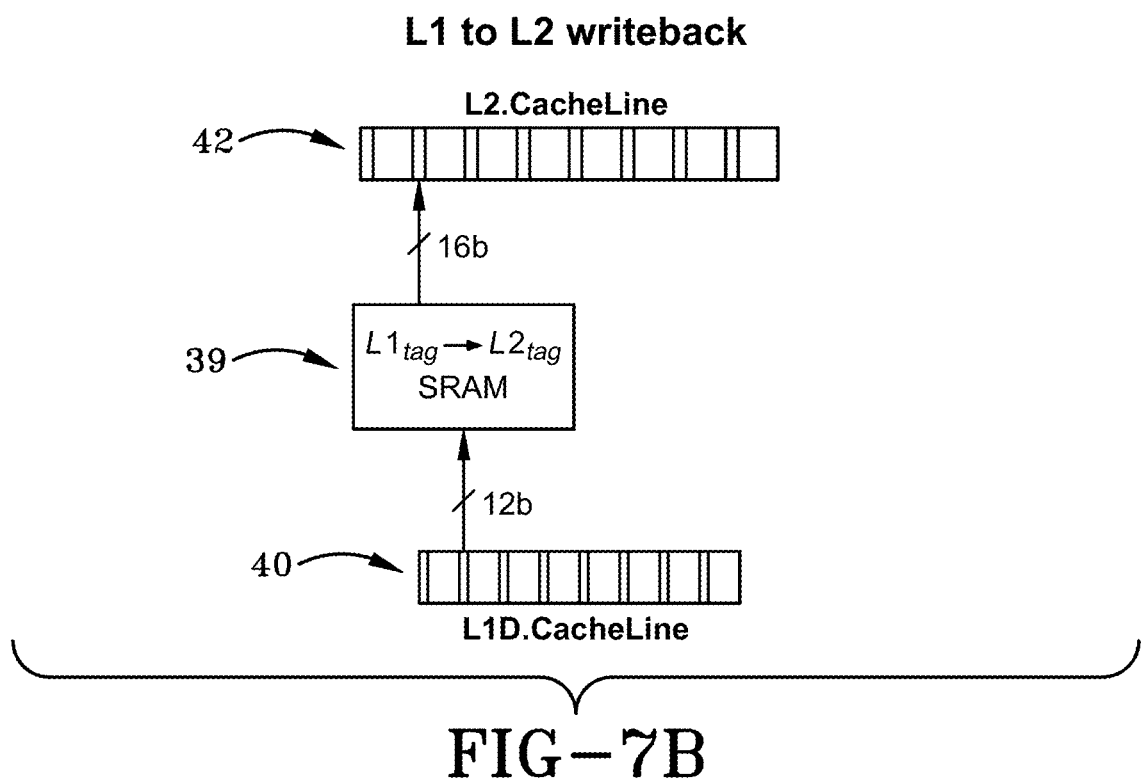
FIG. 7B is a schematic drawings showing translation between 12 b L1 tags and 16 b L2 tags.

FIG. 7B details the translation an L1 tag 40 to L2 tag 42 (on a writeback or an L2 lookup) performed with a SRAM 39 lookup using the L1 tag as the address. A similar translation occurs between the 60 b main memory tags and 16 b L2 tags.

When a long tag is not in the long-to-short translation table, a new short tag is allocated, potentially reclaiming a previously allocated short tag that is no longer in use. There is a rich design space to explore for determining when a short tag can be reclaimed, including garbage collection and tag-usage counting. For simplicity, short tags are allocated sequentially and flush all caches above a given level (instruction, data, and PUMP) when the short tag space is exhausted, avoiding the need to track when a specific short tag is available for reclamation. To make flushes inexpensive, all caches are designed with a lightweight gang clear.

Compared to Table 3 (reproduced in FIG. 16), where each L1 rule cache access costs 51 pJ, the present disclosure reduces down to 10 pJ with 8 b L1 tags or 18 pJ with 16 b L1 tags, with the energy scaling linearly with tag length between these points. The energy impact on the L1 instruction and data caches is small. Similarly, with 16 b L2 tags, L2 PUMP access costs 120 pJ, down from 173 pJ with 64 b tags. Slimming L1 tags also allows us to restore the capacity of the L1 caches. With 12 b tags, the full-capacity (76 KB, effective 64 KB) cache will meet single-cycle timing requirements, reducing the performance penalty the simple implementation incurred from the reduced L1 cache capacity. As a result, L1 tag length exploration is limited to 12 bits or less. While even shorter tags reduce energy, they also increase the frequency of flushes.

Figure 8A:
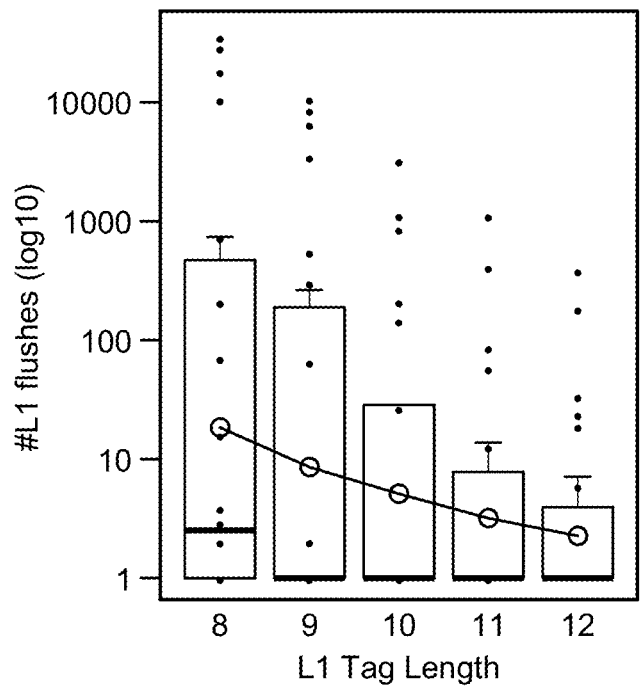
FIG. 8A is a schematic graph showing the impact of L1 tag length on L1 PUMP flushes (log 10)
Figure 8B:
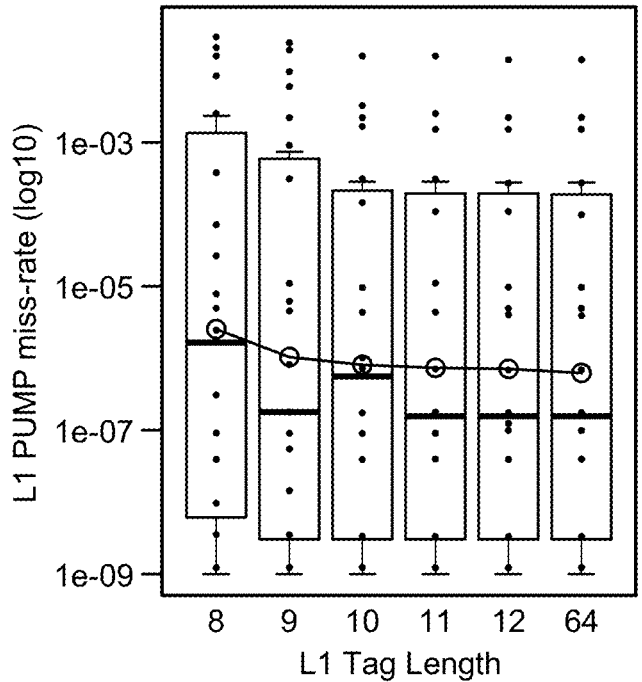
FIG. 8B is a schematic graph showing the impact of L1 tag length on L1 PUMP miss-rates.

FIG. 8A and FIG. 8B depict how flushes decrease with increasing L1 tag length, as well as the impact on the L1 rule cache miss-rate.

Miss Handler Acceleration

Figure 9A:
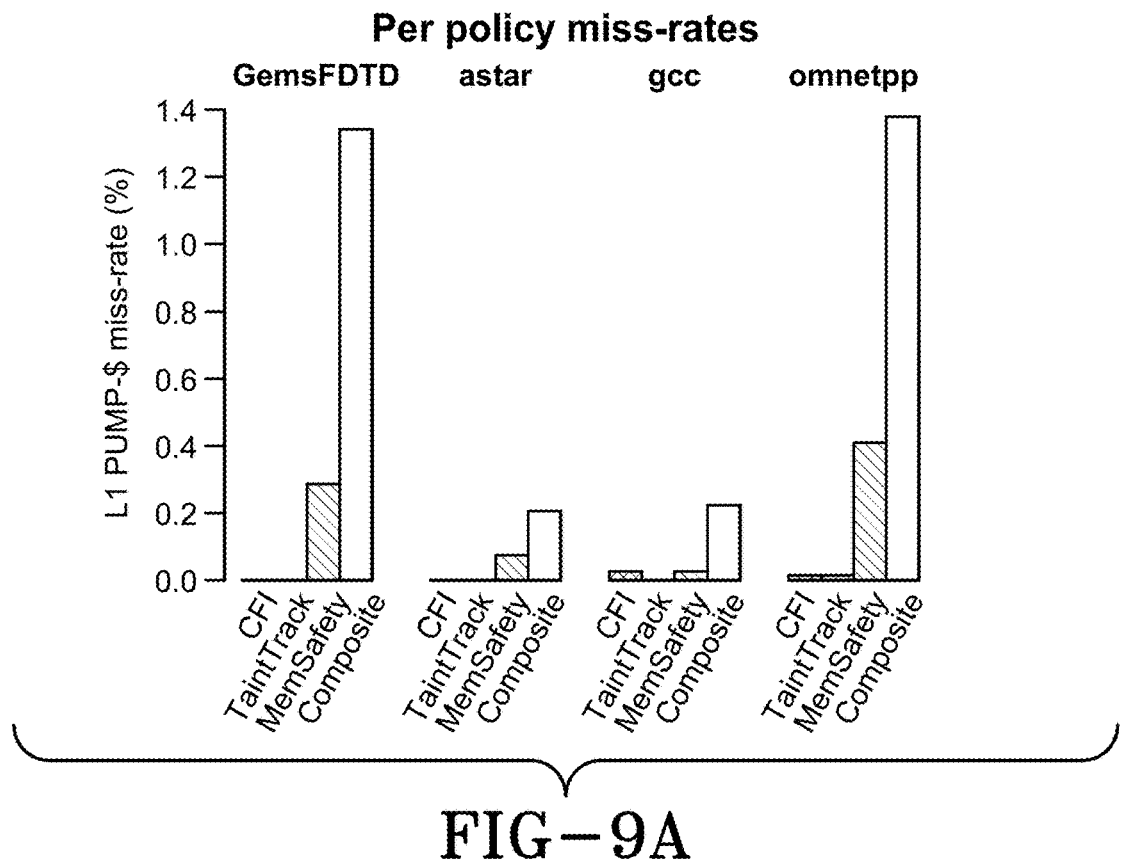
FIG. 9A is a series of bar graphs showing miss rates for different policies.

Enforcing large policies obtained by the orthogonal combination of smaller policies is expensive. The present disclosure illustrates this by combining four policies into a single Composite policy. As depicted in Algorithm 2 reproduced in FIG. 20, each invocation of a N-policy miss handler has to take apart a tuple of tags, and the rules needed for the Composite policy increases the rule cache miss rates, which are identified in FIG. 9A. Even though the Taint Tracking and CFI policies individually have a low miss-rate, a higher miss-rate from the Memory Safety policy drives the miss-rate for the Composite policy high as well. The lower miss rates of the individual policies suggest that their results may be cacheable even when the composite rules are not.

Microarchitecture

Figure 23:
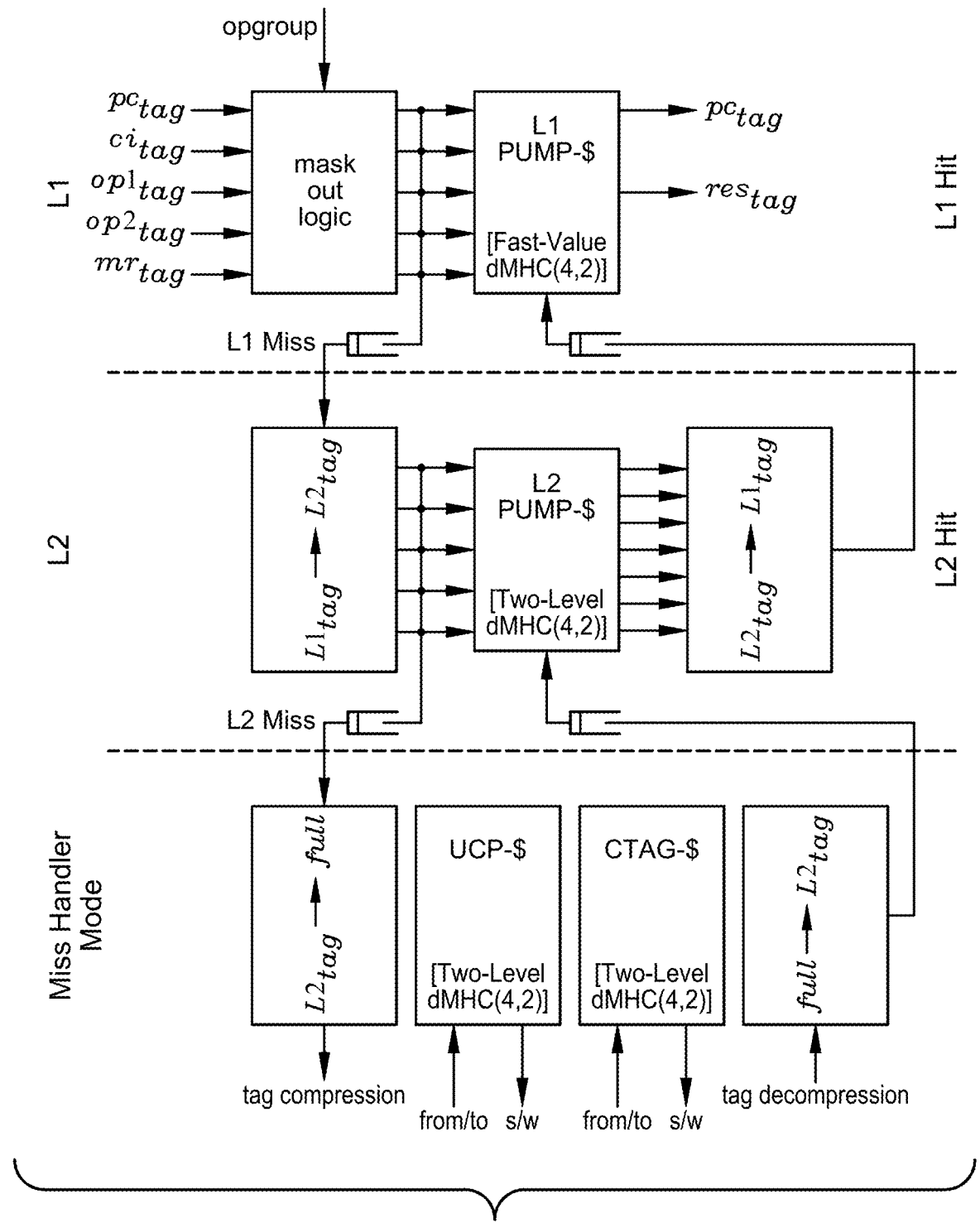
FIG. 23 is a schematic view of the PUMP microarchitecture.

The present disclosure provides two embodiments of hardware structures (also referred to as PUMP microarchitecture; see FIG. 23) to optimize composite policy miss handlers. Initially, a Unified Component Policy (UCP; see Algorithm 3 in FIG. 21) cache is added where the most recent component policy results are cached. The general miss-handler for composite policies is modified to perform lookups in this cache while resolving component policies (see Algorithm 3 in FIG. 21, particularly at line 3). When this cache misses for a component policy its policy computation is performed in software (and insert the result in this cache).

Figure 9B:
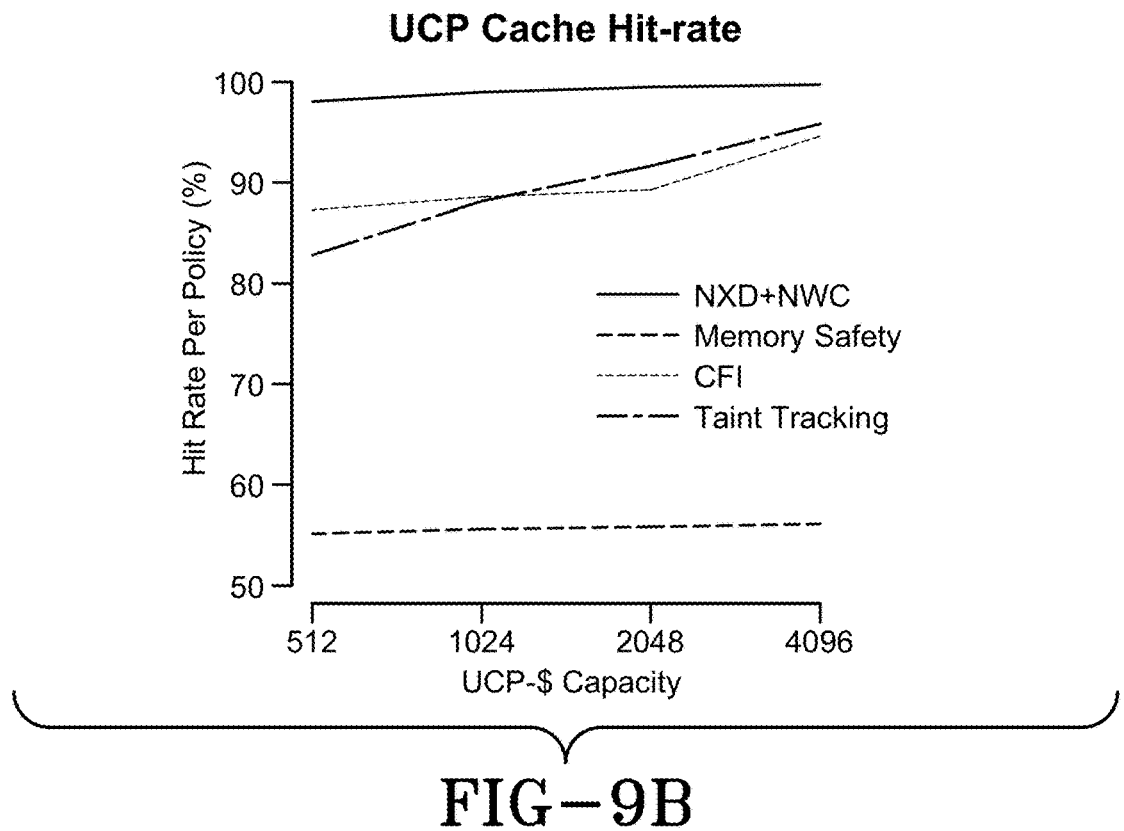
FIG. 9B is a line graph depicting a cache hit rate for four exemplary micro-policies.
Figure 9C:
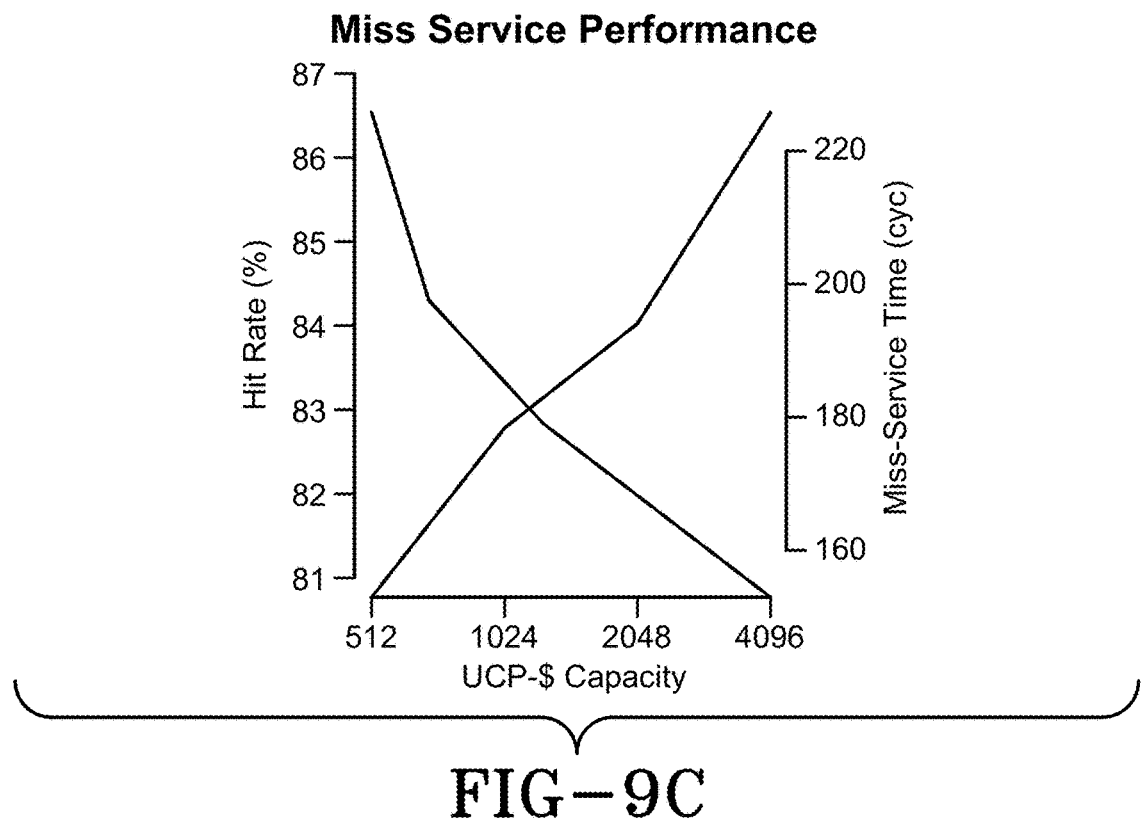
FIG. 9C is a line graph depicting miss service performance.
Figure 9D:
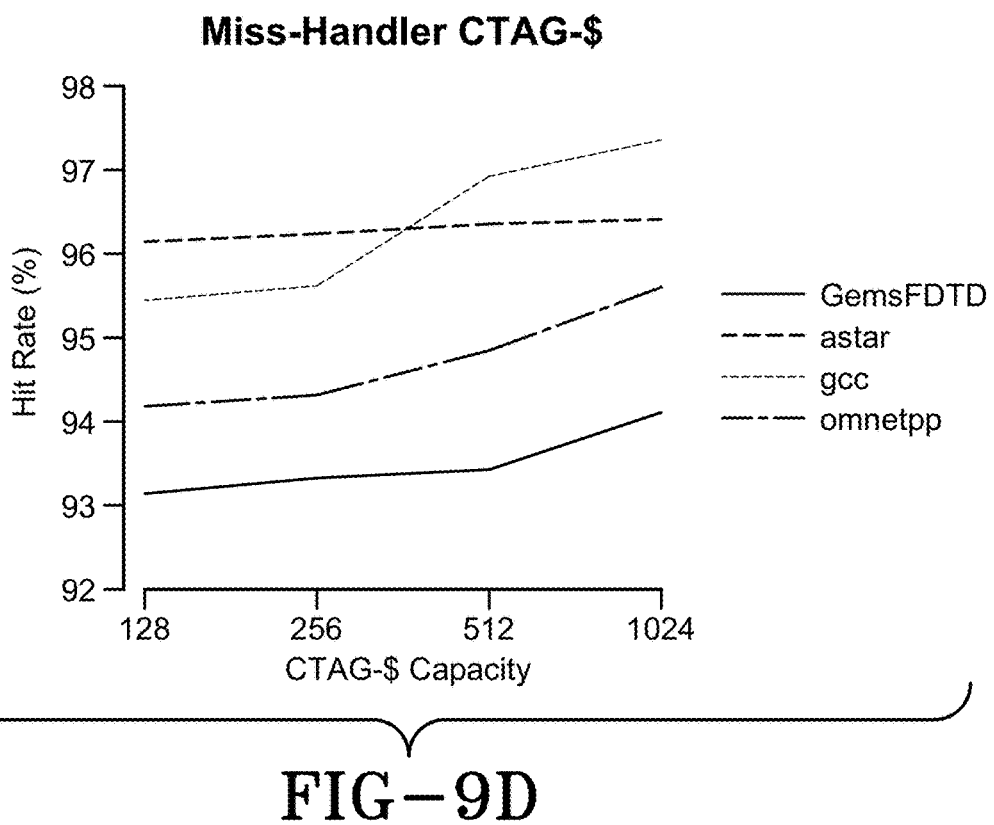
FIG. 9D is a line graph depicting CTAG cache hit rates based on capacity.
Figure 9E:
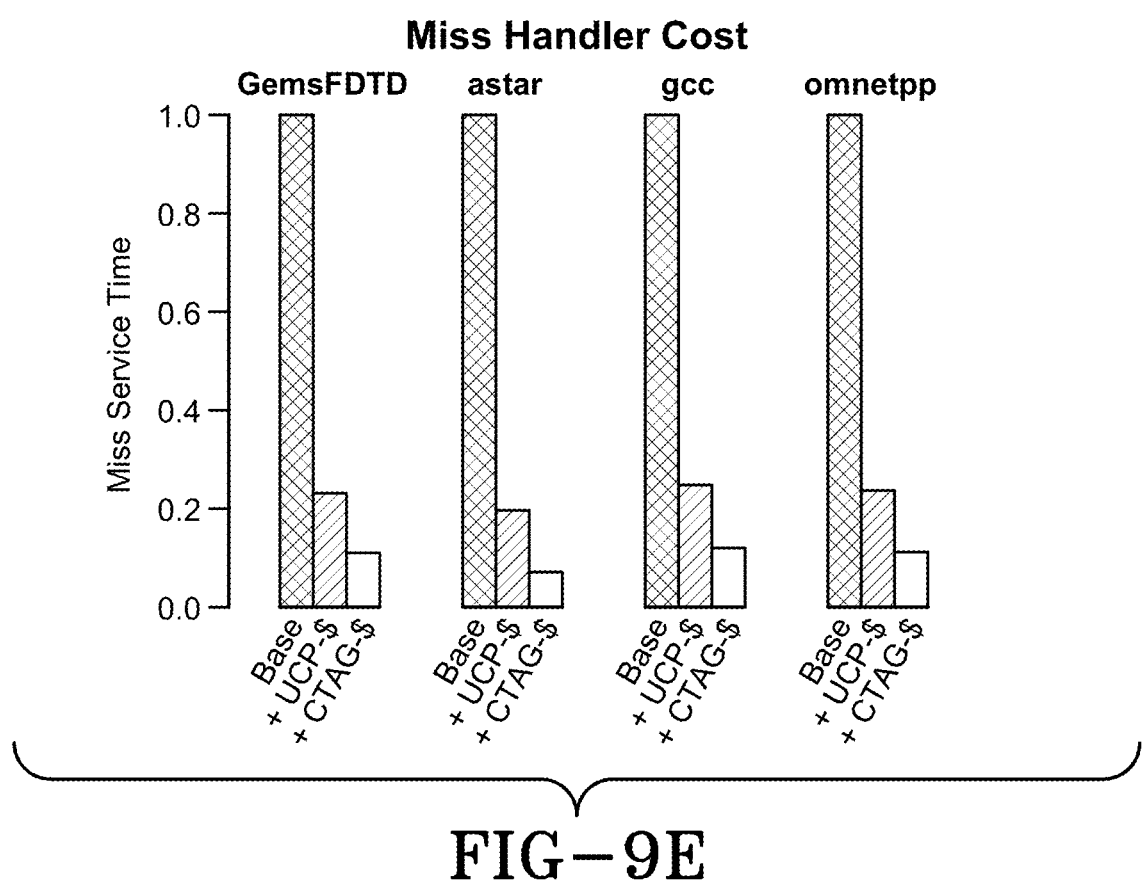
FIG. 9E is a series of bar graphs depicting the impact of optimizations for the composite policy.

As depicted in FIG. 24, the UCP cache is implemented with the same hardware organization as the regular PUMP rule cache, with an additional policy identifier field. A FIFO replacement policy is used for this cache, but it may be possible to achieve better results by prioritizing space using a metric such as the re-computation cost for the component policies. With modest capacity, this cache filters out most policy re-computations (FIG. 9B; the low hit rate for memory safety is driven by compulsory misses associated with new memory allocations). As a result, the average number of miss handler cycles are reduced by a factor of 5 for the most challenging benchmarks (FIG. 9E). It is possible for every policy to hit in the UCP cache when there is a miss in the L2 PUMP since the composite rules needed could be a product of a small number of component policy rules. For GemsFDTD, three or more component policies were hit about 96% of the time.

In the second embodiment (FIG. 24), a cache is added to translate a tuple of result tags into its canonical composite result tag. This Composition Tag (CTAG) cache is effective (FIG. 9D) because it is common for several component policy rules to return the same tuple of result tags. For example, in many cases the $PC_{tag}$ will be the same, even though the result tag is different. Furthermore, many different rule inputs can lead to the same output. For example, in Taint Tracking set unions are performed, and many different unions will have the same result; e.g., (Blue, {A, B, C}) is the composite answer for writing the result of both {A}∪{B, C} and {A, B}∪{B,C} (Taint Tracking) into a Blue slot (Memory Safety). A FIFO replacement policy is used for this cache. The CTAG cache reduces the average miss handler cycles by another factor of 2 (See FIG. 9E).

Taken together, a 2048-entry UCP cache and a 512-entry CTAG cache reduce the average time spent on each L2 rule cache miss from 800 cycles to 80 cycles.

Rule Pre-Fetch

It is additionally possible to reduce the compulsory miss rate with precompute rules that might be needed in the near future. An exemplary instance has high value for the Memory Safety rules. For example when a new memory tag is allocated, new rules will be needed (initialize (1), add offset to pointer and move (3), scalar load (1), scalar store (2)) for that tag. Consequently, all of these rules are added to the UCP cache at once. For the single-policy Memory Safety case, the rules are added directly into the rule caches. This reduces the number of Memory Safety miss-handler invocations by 2×.

Overall Evaluation

Figure 11A:
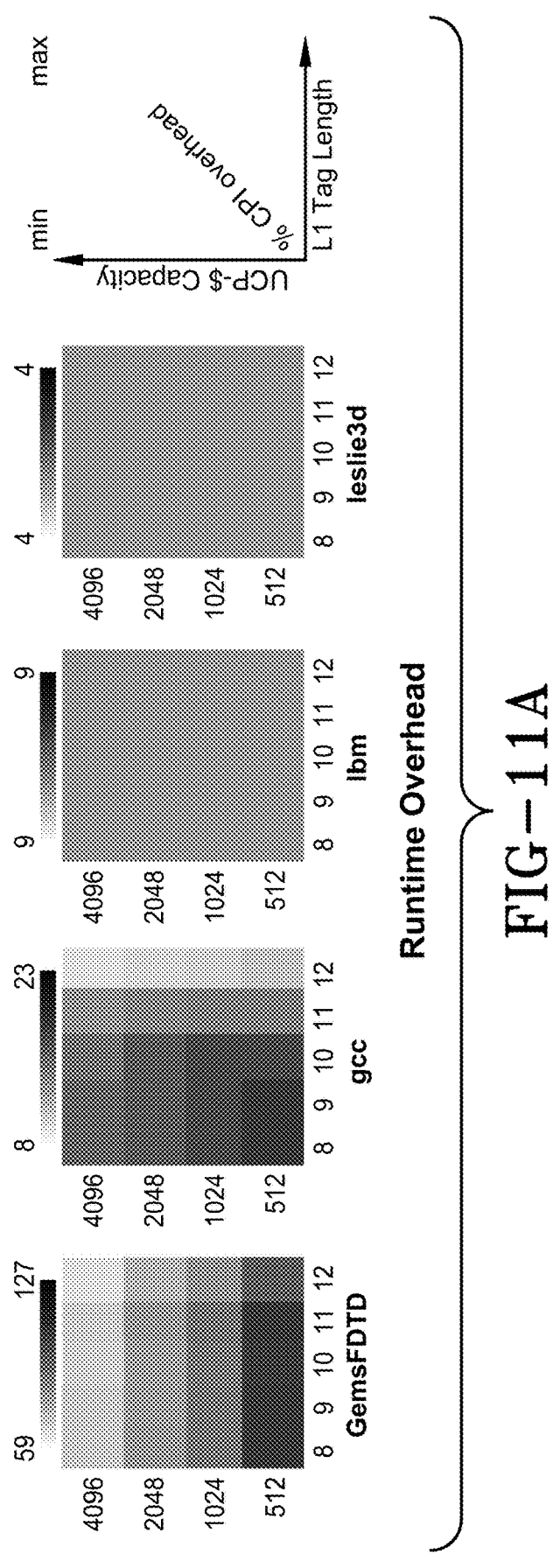

As depicted in FIG. 11A, the architecture parameters monotonically impact a particular cost, providing tradeoffs among energy, delay, and area, but not defining a minimum within a single cost criteria. There is the threshold effect that, once the tag bits are small enough, the L1 D/I caches can be restored to the capacity of the baseline, so that baseline is adopted as the upper bound to explore for L1 tag length, but beyond that point, decreasing tag length reduces energy with small impact on performance.

Figure 11B:
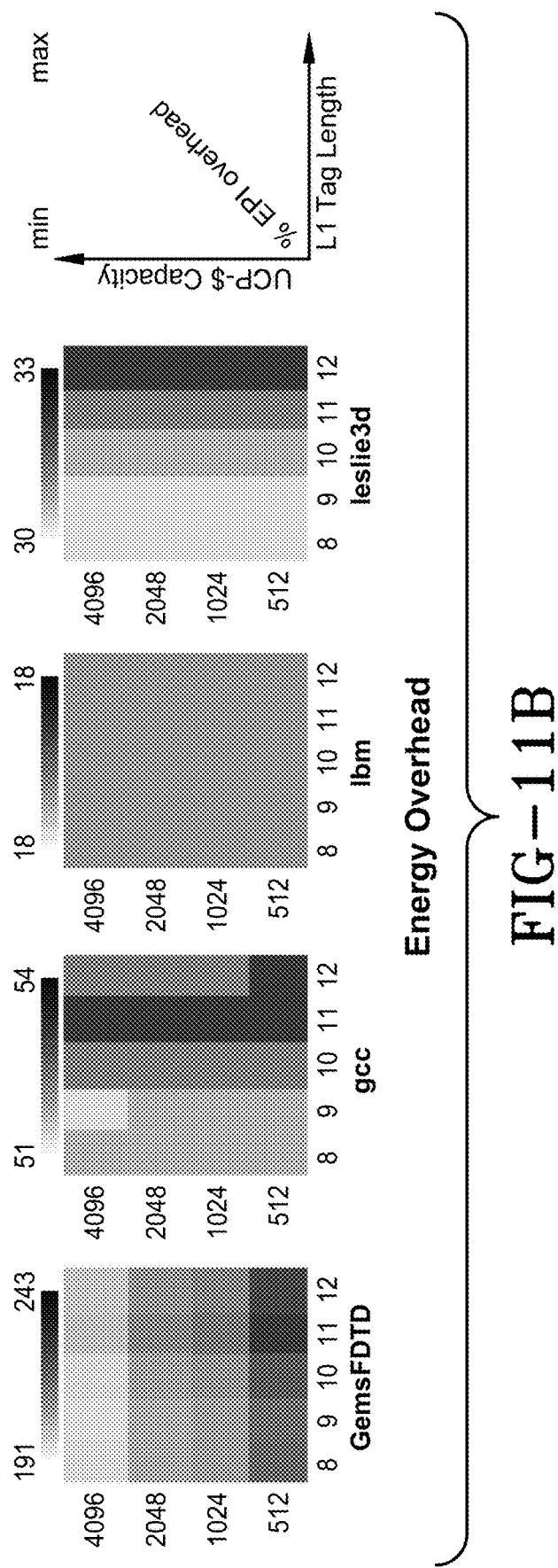
FIG. 11B is a series of shaded graphs depicting energy overhead impact of tag bit length and UCP-$ capacity for different representative benchmarks.

FIG. 11B depicts that reducing tag length is the dominant energy effect for most benchmark programs (e.g. leslie3d, mcf), with a few programs showing equal or larger benefits from increasing UCP cache capacity (e.g., GemsFDTD, gcc). Ignoring other cost concerns, to reduce energy, large miss handler caches and few tag bits are selected. Runtime overhead (see FIG. 11A) is also minimized with larger miss handler caches, but benefits from more rather than fewer tag bits (e.g., GemsFDTD, gcc).

The magnitude of the benefits vary across benchmarks and policies. Across all benchmarks, the benefit beyond 10 b L1 tags is small for the SPEC CPU2006 benchmarks. 10 b L1 tags are used as the compromise between energy and delay and use a 2048-entry UCP cache and a 512-entry CTAG cache to reduce area overhead while coming close to the minimum energy level within the space of the architecture parameters explored.

Runtime and Energy Impact of Optimizations

Figure 12A:
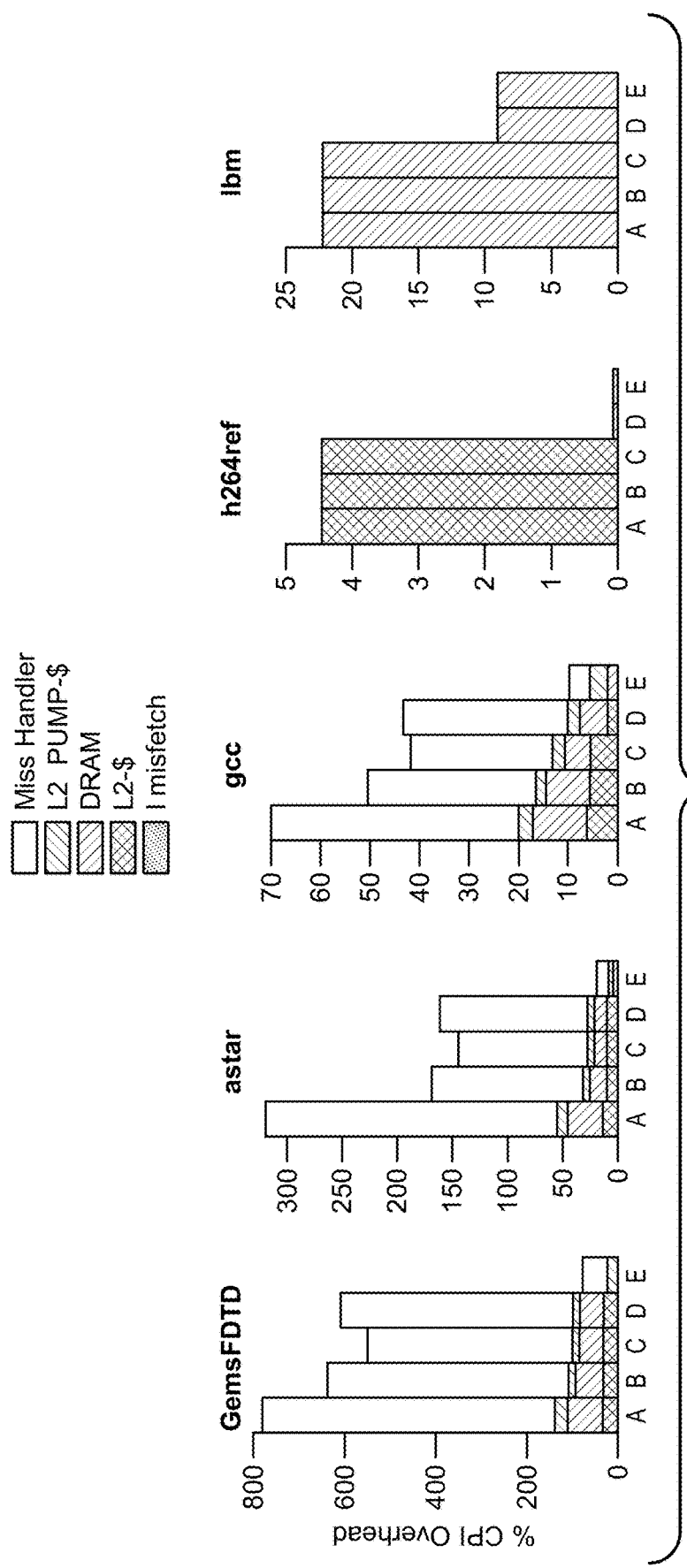
FIG. 12A is a series of graphs showing runtime impact of optimizations on representative benchmarks wherein A: Simple; B: A+Opgrouping; C: B+DRAM Compression; D: C+(10 b L1; 14 b L2) short tags; E: D+(2048-UCP; 512-CTAG))
Figure 12B:
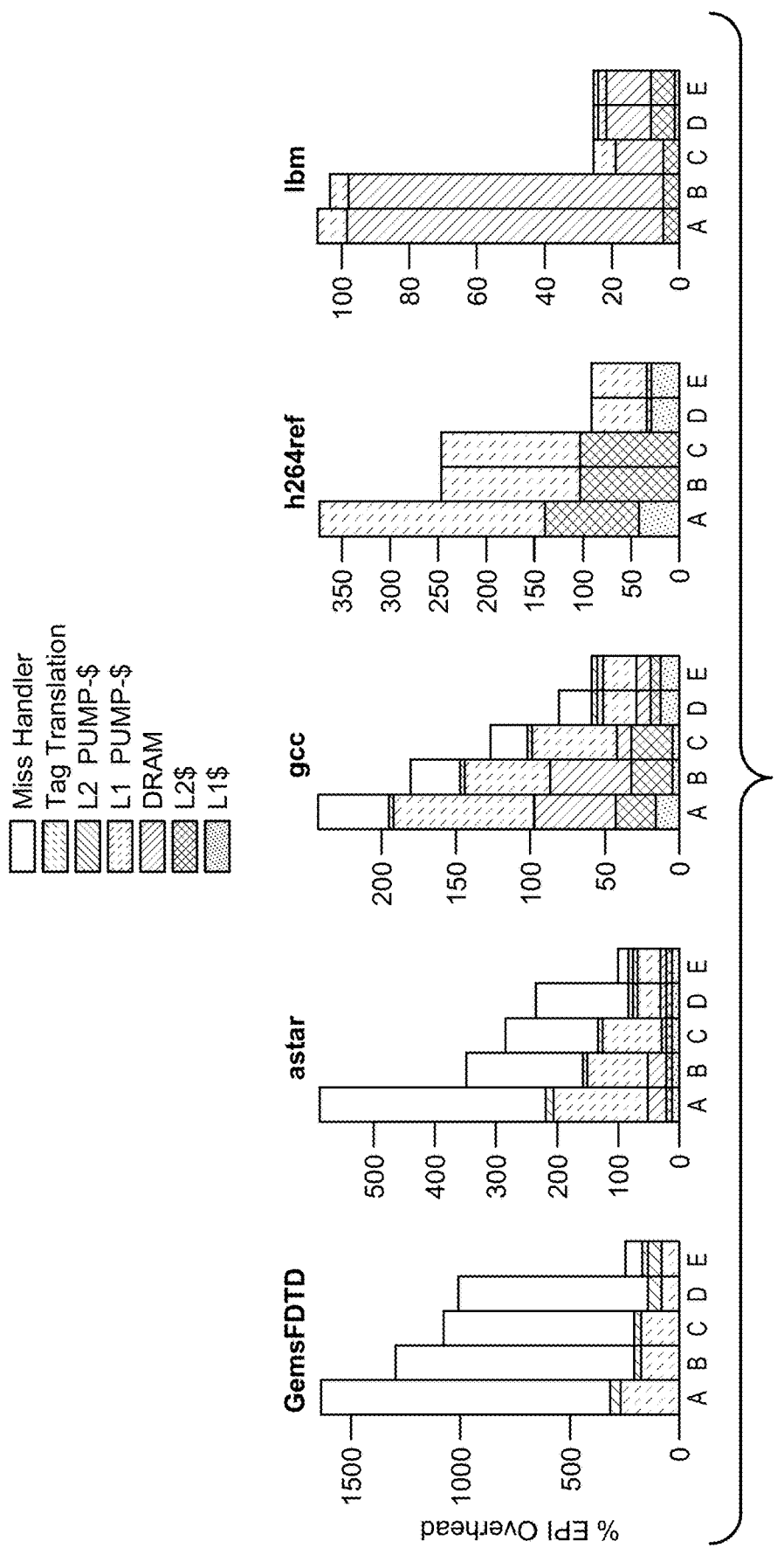
FIG. 12B is a series of graphs showing energy impact of optimizations on representative benchmarks wherein A: Simple; B: A+Opgrouping; C: B+DRAM Compression; D: C+(10 b L1; 14 b L2) short tags; E: D+(2048-UCP; 512-CTAG))

FIG. 12A and FIG. 12B depict the overall impact on runtime and energy overheads of applying the optimizations. Every optimization is dominant for some benchmark (e.g., opgroups for astar, DRAM tag compression for lbm, short tags for h264ref, miss handler acceleration for GemsFDTD), and some benchmarks see benefits from all optimizations (e.g. gcc), with each optimization successively removing one bottleneck and exposing the next. The different behavior from the benchmarks follows their baseline characteristics as detailed below.

Applications with low locality have baseline energy and performance driven by DRAM due to high main memory traffic. The overhead in such benchmarks (e.g., lbm) trends to the DRAM overhead, so reductions in DRAM overhead directly impact runtime and energy overhead. Applications with more locality are faster in the baseline configuration, consume less energy, and suffer less from DRAM overheads; as a result, these benchmarks are more heavily impacted by the reduced L1 capacity and the tag energy in the L1 D/I and rule caches. DRAM optimization has less effect on these applications, but using short tags has a large effect on energy and removes the L1 D/I cache capacity penalty (e.g. h264ref).

Figure 10A:
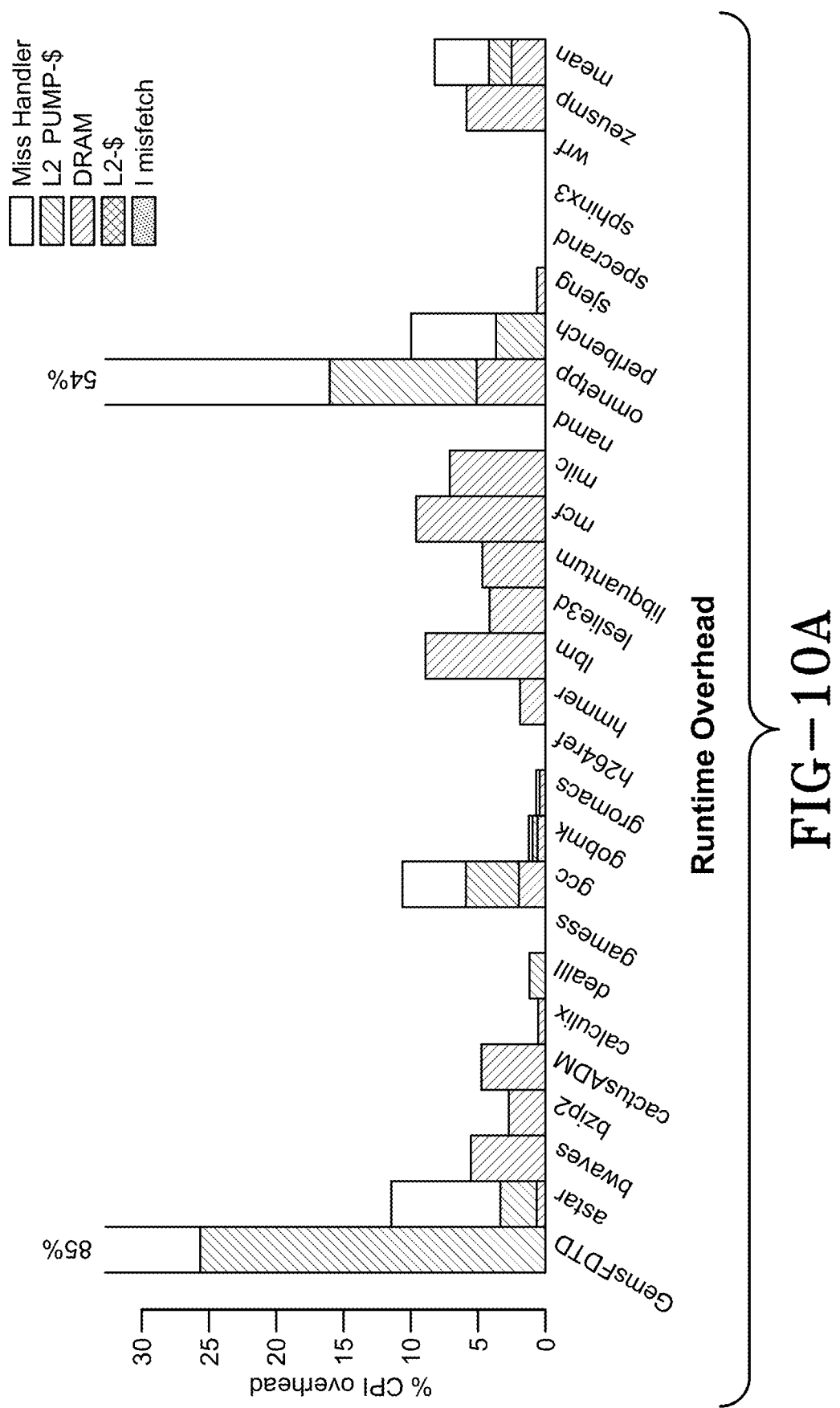
FIG. 10A is a series of graphs showing runtime overhead of optimized implementation.

The benchmarks with heavy dynamic memory allocation have higher L2 rule cache miss rates due to compulsory misses as newly created tags must be installed in the cache. This drove the high overheads for several benchmarks (GemsFDTD, omnetpp) in the simple implementation. The miss handler optimizations reduce the common case cost of such misses, and the opgroup optimization reduces the capacity miss rate. For the simple implementation, GemsFDTD took an L2 rule cache miss every 200 instructions and took 800 cycles to service each miss driving a large part of its 780% runtime overhead (See FIG. 4A). With the optimizations, the GemsFDTD benchmark services an L2 rule cache miss every 400 instructions and takes only 140 cycles on average per miss, reducing its runtime overhead to about 85% (See FIG. 10A).

Figure 10B:
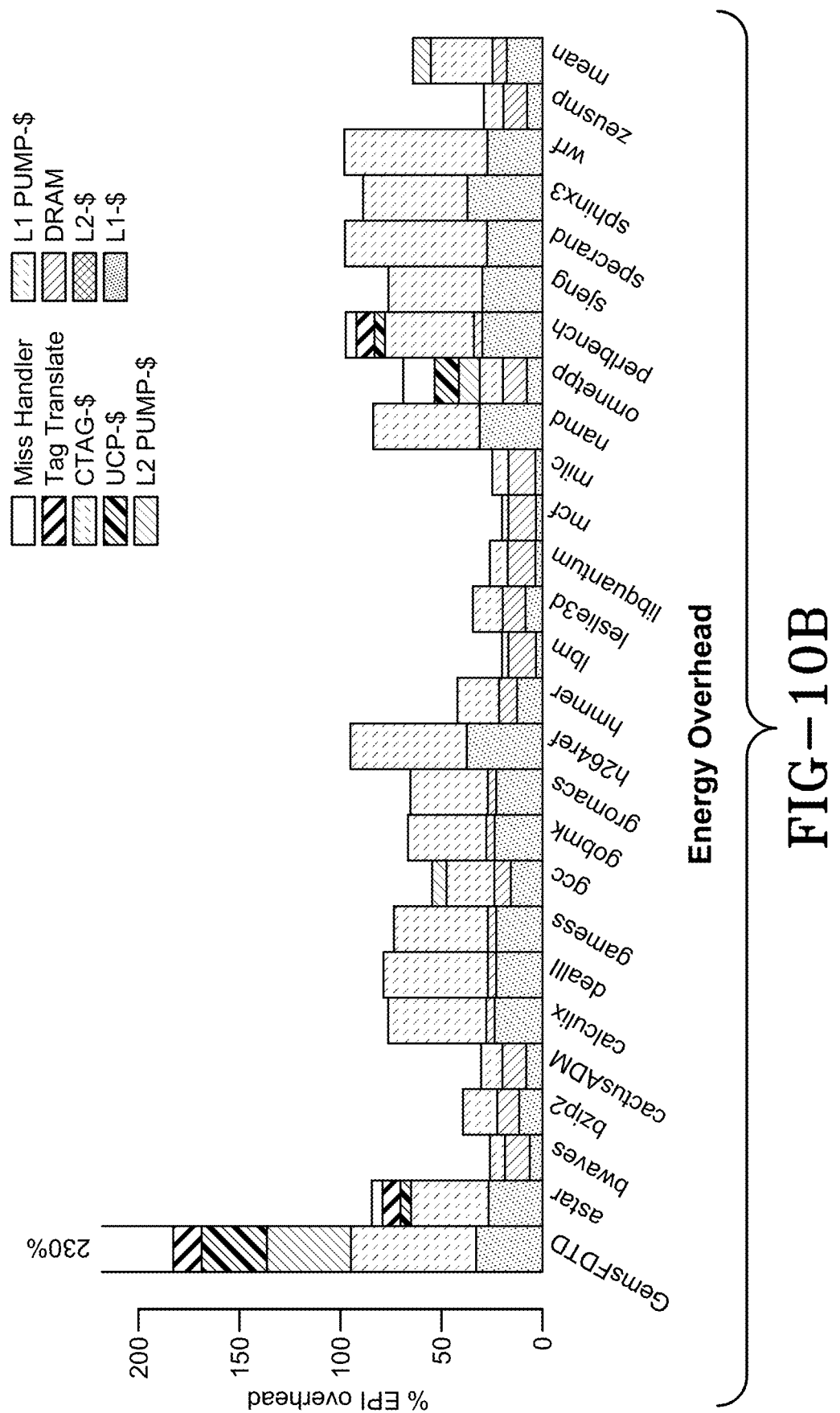
FIG. 10B is a series of bar graphs showing energy overhead of optimized implementation.

Overall, these optimizations bring runtime overhead below 10% for all benchmarks except GemsFDTD and omnetpp (See FIG. 10A), which are high on memory allocation. The mean energy overhead is close to 60%, with only 4 benchmarks exceeding 80% (See FIG. 10B).

The performance impact of the PUMP is measured using a composition of four different policies (See Table 1 at FIG. 14) that stress the PUMP in different ways and illustrate a range of security properties: (1) a Non-Executable Data and Non-Writable Code (NXD+NWC) policy that uses tags to distinguish code from data in memory and provides protection against simple code injection attacks; (2) a Memory Safety policy that detects all spatial and temporal violations in heap-allocated memory, extending with an effectively unlimited (260) number of colors ("taint marks"); (3) a Control-Flow Integrity (CFI) policy that restricts indirect control transfers to only the allowed edges in a program's control flow graph, preventing return-oriented-programming-style attacks (we enforce fine-grained CFI, not coarse-grained approximations that are potentially vulnerable to attack); and (4) a fine-grained Taint Tracking policy (generalizing) where each word can potentially be tainted by multiple sources (libraries and IO streams) simultaneously. Since these are well-known policies whose protection capabilities have been established in the literature, the present disclosure focuses on measuring and reducing the performance impact of enforcing them using the PUMP. Except for NXD+NWC, each of these policies needs to distinguish an essentially unlimited number of unique items; by contrast, solutions with a limited number of metadata bits can, at best, support only grossly simplified approximations.

Figure 10C:
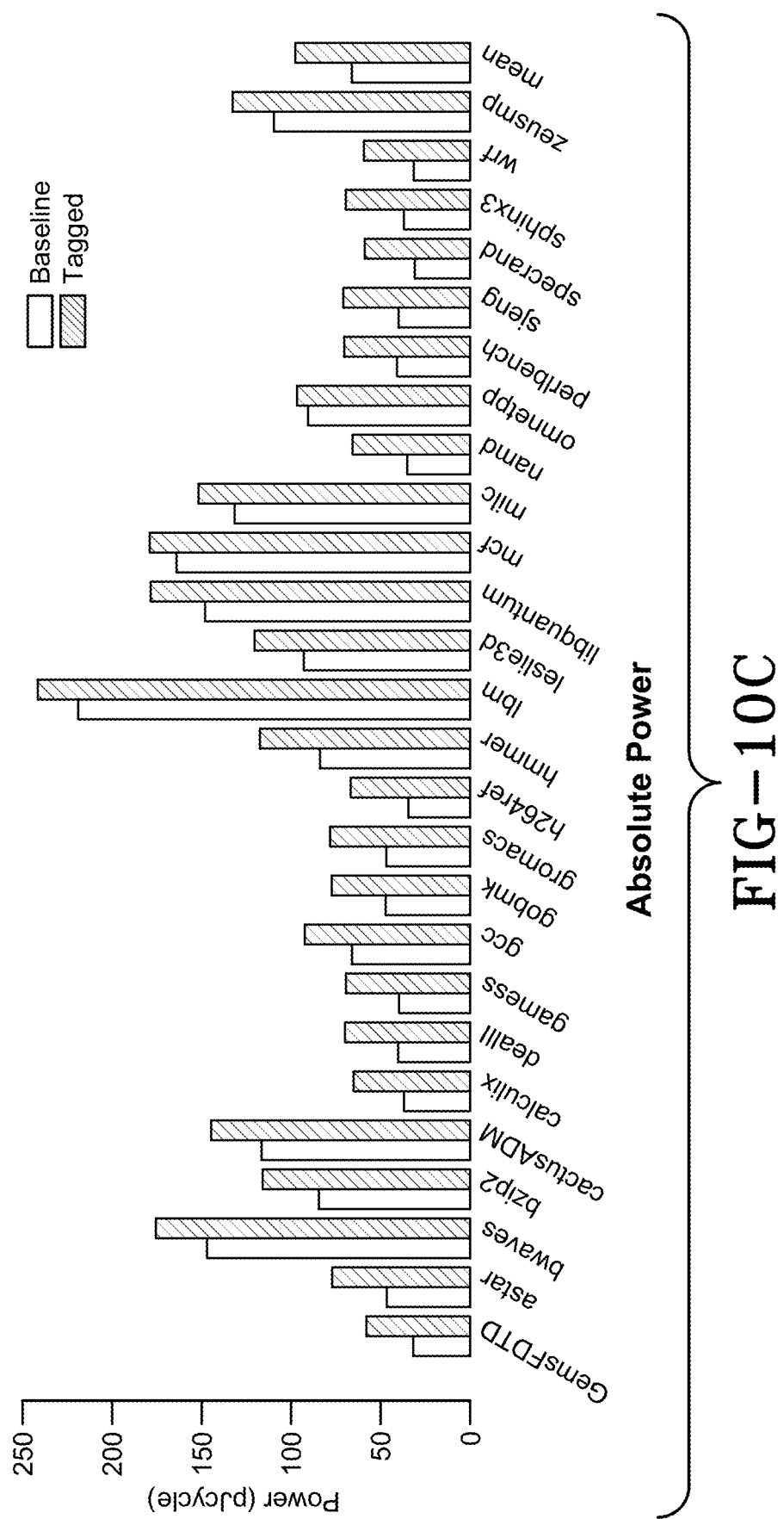
FIG. 10C is a series of bar graphs showing absolute power of optimized implementation compared to a baseline.

In computing, benchmarking is the act of running a computer program, a set of programs, or other operations, in order to assess the relative performance of an object, normally by running a number of standard tests and trials against it. The term 'benchmark' used herein refers to benchmarking programs themselves. The specific benchmark programs used throughout this application and the Figures are GemsFDTD, astar, bwaves, bzip2, cactusADM, calculix, deall, gamess, gcc, gobmk, gromacs, h264ref, hmmer, lbm, leslie3d, libquantum, mcf, milc, namd, omnetpp, perlbench, sjeng, specrand, sphinx3, wrf, zeusmp, and mean. See FIGS. 10A, 10B, and 10C.

Power Ceiling

The micro-architecture optimizations reduce the impact on power ceiling to 10% (See FIG. 10C), suggesting the optimized PUMP will have little impact on the operating envelope of the platform. DRAM compression reduces the energy overhead for lbm to 20%; since it also slows down by 9%, its power requirement only increases by 10%.

Area

The area overhead of the optimized design is around 110% (See Table 5 at FIG. 18), compared to the 190% of the simple design (See Table 3 at FIG. 16). Short tags significantly reduce the area of the L1 and L2 caches (now adding only 5% over the baseline) and of the rule caches (adding only 26%). Contrarily, the optimized design spends some area to reduce runtime and energy overhead. The UCP and CTAG caches add 33% area overhead, while the translation memories for short tags (both L1 and L2) add another 46%. While these additional hardware structures add area, they provide a net reduction in energy, since they are accessed infrequently and the UCP and CTAG caches also substantially reduce the miss-handler cycles.

Policy Scaling

A key goal of the present disclosure model (and optimizations) is to make it relatively simple to add additional policies that are simultaneously enforced. The Composite policy on the simple PUMP design incurred more than incremental costs for several benchmarks due to the large increase in miss handler runtime, but these are reduced with the miss handler optimizations.

Figure 13A:
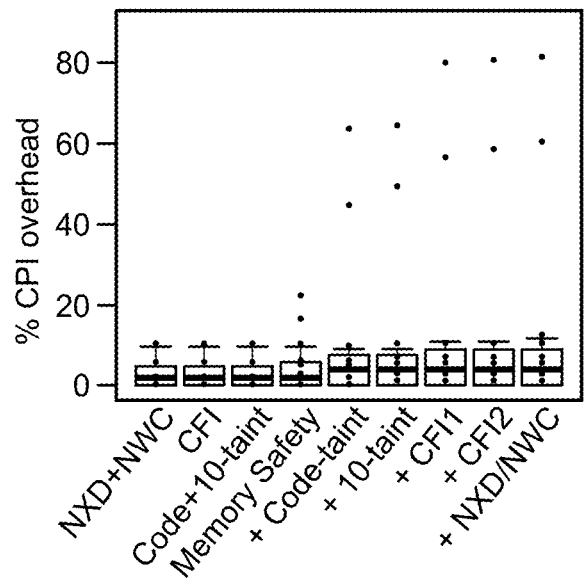
FIG. 13A is a series of graphs showing runtime policy impact in composition for a representative benchmark.
Figure 13B:
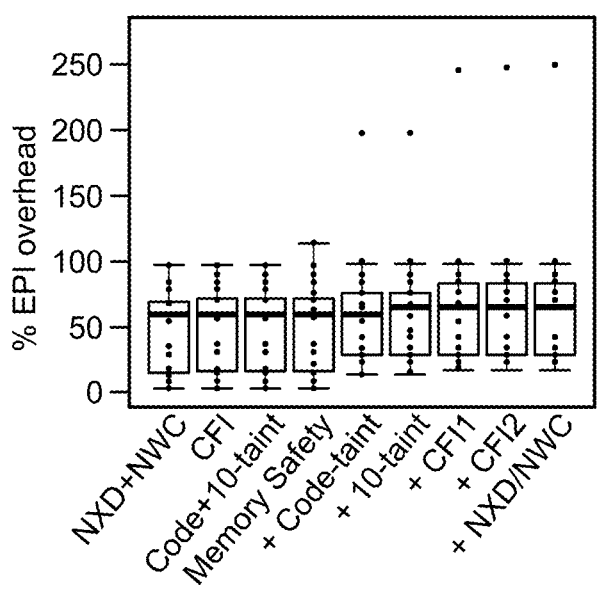
FIG. 13B is a series of graphs showing energy policy impact in composition.

FIG. 13A (for CPI overhead) and FIG. 13B (for EPI overhead) illustrate how incremental addition of policies now impacts runtime overhead by first showing the overhead of each single policy, then showing composites that add policies to Memory Safety, the most complex single policy. The progression makes it clearer what overhead comes simply from adding any policy as opposed to adding a higher-overhead policy. To get a sense of scaling beyond the four policies here, the CFI policy (returns and computed-jumps/calls) and the taint tracking policy (code tainting and I/O tainting) are each broken into two parts. It is shown that the runtime overhead of additional policies tracks incrementally above the first complex policy (Memory Safety), with no appreciable runtime impact on the non-outliers (worst-case non-outlier rises from 9% to 10% overhead) and a larger increase (20-40%) in the two outliers as each new kind of policy is added due mostly to increased miss-handler resolution complexity. Energy follows a similar trend with modest impact (geomean rises from 60% to 70%) on the non-outlier policies, which account for everything except GemsFDTD.

A brief summary of related work is identified in Table 2 reproduced at FIG. 15.

Policy Programming Model

A PUMP policy consists of a set of tag values together with a collection of rules that manipulate these tags to implement some desired tag propagation and enforcement mechanism. Rules come in two forms: the software layer (symbolic rules) or hardware layer (concrete rules) of the system.

For example, to illustrate the operation of the PUMP, consider a simple example policy for restricting return points during program execution. The motivation for this policy comes from a class of attacks known as return-oriented programming (ROP), where the attacker identifies a set of "gadgets" in the binary executable of the program under attack and uses these to assemble complex malicious behaviors by constructing appropriate sequences of stack frames, each containing a return address pointing to some gadget; a buffer overflow or other vulnerability is then exploited to overwrite the top of the stack with the desired sequence, causing the snippets to be executed in order. One simple way of limiting ROP attacks is to constrain the targets of return instructions to well-defined return points. This is accomplished by using the PUMP by tagging instructions that are valid return points with a metadata tag target. Each time a return instruction is executed, the metadata tag on the PC is set to check to indicate that a return has just occurred. On the next instruction, the PC tag is check, verify that the tag on the current instruction is target, and signal a security violation if not. By making the metadata richer, it is possible to precisely control which return instructions can return to which return points. By making it yet richer, full CFI checking may be implemented.

Symbolic Rules

From the point of view of the policy designer and the software parts of the PUMP 10, policies are compactly described using symbolic rules written in a tiny domain-specific language.

Concrete Rules

Symbolic rules can compactly encode a great variety of metadata tracking mechanisms. At the hardware level, however, a rule is needed for representation that is tuned for efficient interpretation to avoid slowing down the primary computation. To this end, a lower level rule format called concrete rules is introduced. Intuitively, each symbolic rule for a given policy can be expanded into an equivalent set of concrete rules. However, since a single symbolic rule might in general generate an unbounded number of concrete rules, this elaboration is performed lazily, generating concrete rules as needed while the system executes.

Structured Tags

For policies with richer metadata tags than ROP, the translation from symbolic to concrete rules follows the same general lines, but the details become a bit more intricate. For example, the taint-tracking policy takes tags to be pointers to memory data structures, each describing an arbitrarily sized set of taints (representing data sources or system components that may have contributed to a given piece of data). The symbolic rule for the load opgroup says that the taint on the loaded value should be the union of the taints on the instruction itself, the target address for the load, and the memory at that address.

To reduce the number of distinct tags (and, hence, pressure on the rule cache), metadata structures are internally stored in canonical form and since tags are immutable, sharing is fully exploited (e.g., set elements are given a canonical order so that sets can be compactly represented sharing common prefix subsets). When no longer needed, these structures can be reclaimed (e.g., by garbage collection).

Composite Policies

Multiple orthogonal policies may be simultaneously enforced by letting tags be pointers to tuples of tags from several component policies. (In general, multiple policies may not be orthogonal) For example, to compose the first return opgroup (ROP) policy with the taint-tracking policy, let each tag be a pointer to a representation of a tuple (r; t), where r is an ROP-tag (a code location identifier) and t is a taint tag (a pointer to a set of taints). The cache lookup process is exactly the same, but when a miss occurs the miss handler extracts the components of the tuple and dispatches to routines that evaluate both sets of symbolic rules (FIG. 20). The operation is allowed only if both policies have a rule that applies; in this case the resulting tag is a pointer to a pair containing the results from the two sub-policies.

Policy System and Protection

The policy system exists as a separate region of memory within each user process. It includes the code for the miss handler, the policy rules, and the data structures representing the policy's metadata tags. Placing the policy system in the process is minimally invasive with the existing Unix process model and facilitates lightweight switching between the policy system and the user code. The policy system is isolated from user code using mechanisms described next.

Metadata Threat Model

Clearly, the protection offered by the PUMP would be useless if the attacker could rewrite metadata tags or change their interpretation. The present disclosure is designed to prevent such attacks. The kernel, loader, and (for some policies) compiler is trusted. In particular, the compiler is relied on to assign initial tags to words and, where needed, communicate rules to the policy system. The loader will preserve the tags provided by the compiler, and that the path from the compiler to the loader is protected from tampering, e.g., using cryptographic signatures.

A standard Unix-style kernel is assumed, which sets up the initial memory image for each process. (It may be possible to use micro-policies to eliminate some of these assumptions, further reducing the size of the TCB). It is further assumed that the rule-cache-miss-handling software is correctly implemented. This is small, hence a good target for formal verification.

One concern is to prevent user code running in a process from undermining the protection provided by the process's policy. User code should not be able to (i) manipulate tags directly—all tag changes should be performed in accordance with the policy/policies rules currently in effect; (ii) manipulate the data structures and code used by the miss handler; (iii) directly insert rules in the hardware rule cache.

Addressing

To prevent direct manipulation of tags by user code, the tags attached to every 64 b word are not, themselves, separately addressable. In particular, it is not possible to specify an address that corresponds only to a tag or a portion of a tag in order to read or write it. All user accessible instructions operate on (data, tag) pairs as atomic units—the standard ALU operating on the value portion and the PUMP operating on the tag portion.

Miss Handler Architecture

The policy system is only activated on misses to the PUMP cache. To provide isolation between the policy system and user code, a miss-handler operational mode is added to the processor. The integer register file is expanded with 16 additional registers that are available only to the miss handler, to avoid saving and restoring registers. Note, the use of 16 additional registers is illustrative and in practice may need to expand the integer register file to less/more registers. The PC of the faulting instruction, the rule inputs (opgroup and tags), and the rule outputs appear as registers while in miss handler mode. A miss-handler-return instruction is added, which finishes installing a concrete rule into the cache and returns to user code.

The normal behavior of the PUMP 10 is disengaged while the processor 12 is in miss-handler mode. Instead, a single hardwired rule is applied: all instructions and data touched by the miss handler must be tagged with a predefined miss-handler tag that is distinct from the tags used by any policy. This ensures isolation between miss handler code and data and the user code in the same address space. User code cannot touch or execute policy system data or code, and the miss handler cannot accidentally touch user data and code. The miss-handler-return instruction can only be issued in miss-handler mode, preventing user code from inserting any rules into the PUMP.

Non-Limiting Discussion

While previous work has used clever schemes to compactly represent or approximate safety and security policies, this is often a compromise on the intended policy, and it may trade complexity for compactness. The present disclosure shows that it is possible to include richer metadata that captures the needs of the security policies both more completely and more naturally with little or no additional runtime overhead. Rather than imposing a fixed bound on the metadata representation and policy complexity, the PUMP 10 provides a graceful degradation in performance. This allows policies to use more data where needed without impacting the common case performance and size. It further allows the incremental refinement and performance tuning of policies, since even complex policies can easily be represented and executed.

With evidence mounting for the value of metadata-based policy enforcement, the present disclosure defines an architecture for software-defined metadata processing and identifies accelerators to remove most of the runtime overhead. An architecture is introduced with no bounds (i.e., free from any bound) on the number of metadata bits or the number of policies simultaneously supported along with four microarchitecture optimizations (opgroups, tag compression, tag translation, and miss handler acceleration) that achieve performance comparable to dedicated, hardware metadata propagation solutions. The software defined metadata policy model and its acceleration will be applicable to a large range of policies beyond those illustrated here, including sound information-flow control, fine-grained access control, integrity, synchronization, race detection, debugging, application-specific policies, and controlled generation and execution of dynamic code.

Some non-limiting advantages of the present disclosure provide (i) a programming model and supporting interface model for compactly and precisely describing policies supported by this architecture; (ii) detailed examples of policy encoding and composition using four diverse classes of well-studied policies; and (iii) quantification of the requirements, complexity, and performance for these policies.

The programming model of the present disclosure can encode a host of other policies. Information-flow control is richer than the simple taint tracking models here, and tracking implicit flows can be supported either with RIFLE-style binary translation or by using the PC tag along with some support from the compiler. Micro-policies can support lightweight access control and compartmentalization. Tags can be used to distinguish unforgeable resources. Unique, generated tokens can act as keys for sealing and endorsing data, which in turn can be used for strong abstraction— guaranteeing that data is only created and destructured by authorized code components. Micropolicy rules can enforce data invariants such as immutability and linearity. Micropolicies can support parallelism as out-of-band metadata for synchronization primitives such as full/empty bits for data or futures or as state to detect race conditions on locks. A system architect can apply specific micro-policies to existing code without auditing or rewriting every line.

The PUMP 10 design offers an attractive combination of flexibility and performance, supporting a diverse collection of low-level, fine-grained security policies with single policy performance comparable to dedicated mechanisms in many cases while supporting richer and composite policies with mostly graceful performance degradation as rule complexity grows. It is possible for the mechanisms provided by the PUMP can be used to protect its own software structures. It is possible to replace the special miss-handler operational mode by implementing a "compartmentalization" micro-policy using the PUMP 10 and using this to protect the miss-handler code. Finally, it is seen here that it is easy to combine orthogonal sets of policies, where the protections provided by each one are completely independent of the others. But policies often interact: for example, an information-flow policy may need to place tags on fresh regions being allocated by a memory safety policy. Policy composition requires more study both in expression and in efficient hardware support.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the present disclosure are an example and the present disclosure is not limited to the exact details shown or described.

The invention claimed is:

1. A Reduced Instruction Set Computer (RISC), comprising:
   a pipeline processor including a plurality of stages, wherein the stages further comprise a fetch stage, a decode stage, an execute stage, a memory stage, and a writeback stage; and
   a metadata processing stage as one of the stages of the pipeline processor between the memory stage and the writeback stage, the metadata processing stage defining one or more security policies on data flowing within the pipeline processor and adding metadata tags to the data to generate metadata tagged data that is moved through the stages.

2. The Reduced Instruction Set Computer according to claim 1, further comprising at least one cache coupled to at least one of the decode stage, the execute stage, the memory stage, and the writeback stage.

3. The Reduced Instruction Set Computer according to claim 1, further comprising a rule cache lookup stage.

4. The Reduced Instruction Set Computer according to claim 1, wherein the metadata tags are unbounded to enforce any number of policies at the same time.

5. The Reduced Instruction Set Computer according to claim 1, further comprising: at least one microarchitecture optimization operatively connected with the metadata processing stage, wherein the microarchitecture optimization is selected from a group comprising grouped instruction operation codes, tag compression, tag translation, and miss handler acceleration.

6. The Reduced Instruction Set Computer according to claim 5, further comprising a tag compression logic utilizing a spatial tag locality to compress tag bits, and after compression transfer the compressed tag bits to and from an off-chip memory.

7. The Reduced Instruction Set Computer according to claim 5, further comprising a tag translation logic to translate the tag bits between different levels of memory hierarchy.

8. The Reduced Instruction Set Computer according to claim 5, further comprising a plurality of tag checking and propagation rules defined in software and executable by the processor; and a metadata processing rule cache operating in parallel with the stage of the pipeline processor.

9. The Reduced Instruction Set Computer according to claim 1, wherein the metadata processing stage is a Programmable Unit for Metadata Processing (PUMP) having logic adapted to provide policy enforcement and metadata propagation.

10. The Reduced Instruction Set Computer according to claim 9, wherein the logic of the PUMP includes instructions to empirically evaluate runtime, energy, power ceiling, and area impacts of the PUMP.

11. The Reduced Instruction Set Computer according to claim 9, wherein the logic of the PUMP includes instructions to implement a set of micro-architectural optimizations.

12. The Reduced Instruction Set Computer according to claim 11, wherein the logic of the PUMP includes instructions to measure gains from the set of micro-architectural optimizations.

13. The Reduced Instruction Set Computer according to claim 9, wherein the PUMP includes hardware for single-cycle common-case computation on metadata.

14. The Reduced Instruction Set Computer according to claim 9, wherein the PUMP includes instructions for two output tags to be computed from up to five input tags.

15. The Reduced Instruction Set Computer according to claim 9, wherein the PUMP includes a hardware cache of the most recently used rules.

16. The Reduced Instruction Set Computer according to claim 1, wherein the metadata processing stage is a separate stage that is distinct from the memory stage and the writeback stage.

17. A Reduced Instruction Set Computer (RISC), comprising:
a pipeline processor including a plurality of stages, wherein the stages further comprise a fetch stage, a decode stage, an execute stage, a memory stage, and a writeback stage; and
a metadata processing stage as one of the stages of the pipeline processor between the execute stage and the writeback stage, the metadata processing stage defining one or more security policies on data flowing within the pipeline processor and adding metadata tags to the data to generate metadata tagged data that is moved through the stages.

18. A Reduced Instruction Set Computer (RISC), comprising:
a pipeline processor including a plurality of stages, wherein the stages further comprise a fetch stage, a decode stage, an execute stage, a memory stage, and a writeback stage; and
a metadata processing stage as one of the stages of the pipeline processor between the decode stage and the writeback stage, the metadata processing stage defining one or more security policies on data flowing within the pipeline processor and adding metadata tags to the data to generate metadata tagged data that is moved through the stages.

\* \* \* \* \*